United States Patent [19]

Komoda et al.

[11] 4,422,497
[45] Dec. 27, 1983

[54] DEVICE OF CONTROLLING THE IDLING SPEED OF AN ENGINE

[75] Inventors: Norio Komoda, Aichi; Nobuyuki Kobayashi, Toyota; Hiroshi Itoh, Nagoya; Yozi Nishimura, Toyota; Shigenobu Obara, Okazaki, all of Japan

[73] Assignee: Toyota Jidosha Kogyo Kabushiki Kaisha, Toyota, Japan

[21] Appl. No.: 327,115

[22] Filed: Dec. 3, 1981

[30] Foreign Application Priority Data

Jun. 5, 1981 [JP] Japan .................................. 56-85628

[51] Int. Cl.³ .......................... B60H 3/04; F22B 21/04
[52] U.S. Cl. ..................................... 165/23; 62/323.1; 165/43; 123/339
[58] Field of Search ................. 62/133, 323.1; 236/13; 165/23, 43; 123/339

[56] References Cited

U.S. PATENT DOCUMENTS

| | | | |
|---|---|---|---|
| 4,250,956 | 2/1981 | Ohtani | 165/23 X |
| 4,289,100 | 9/1981 | Kinugawa et al. | 62/323.1 |
| 4,346,686 | 8/1982 | Wahta et al. | 123/339 |
| 4,383,574 | 5/1983 | Yoshioka | 165/43 |

*Primary Examiner*—William E. Wayner
*Attorney, Agent, or Firm*—Cushman, Darby & Cushman

[57] ABSTRACT

An engine comprising a main intake passage having a throttle valve therein. A bypass passage is branched off from the main intake passage located upstream of the throttle valve and is connected to the main intake passage located downstream of the throttle valve. A flow control valve, actuated by a step motor, is arranged in the bypass passage. When the engine is operating in an idling state, the step motor is rotated in a rotating direction wherein the engine speed approaches a desired idling speed. An air conditioning device is provided, which comprises an air duct, an evaporator arranged in the air duct, a heat exchanger arranged in the air duct, and an air mixture damper for controlling the flow of air which has passed through the evaporator. The desired engine speed is increased when the temperature of air, which has passed through the evaporator, becomes higher than a predetermined temperature and when the entire air, which has passed through the evaporator, directly flows into the driver's compartment without passing through the evaporator.

6 Claims, 27 Drawing Figures

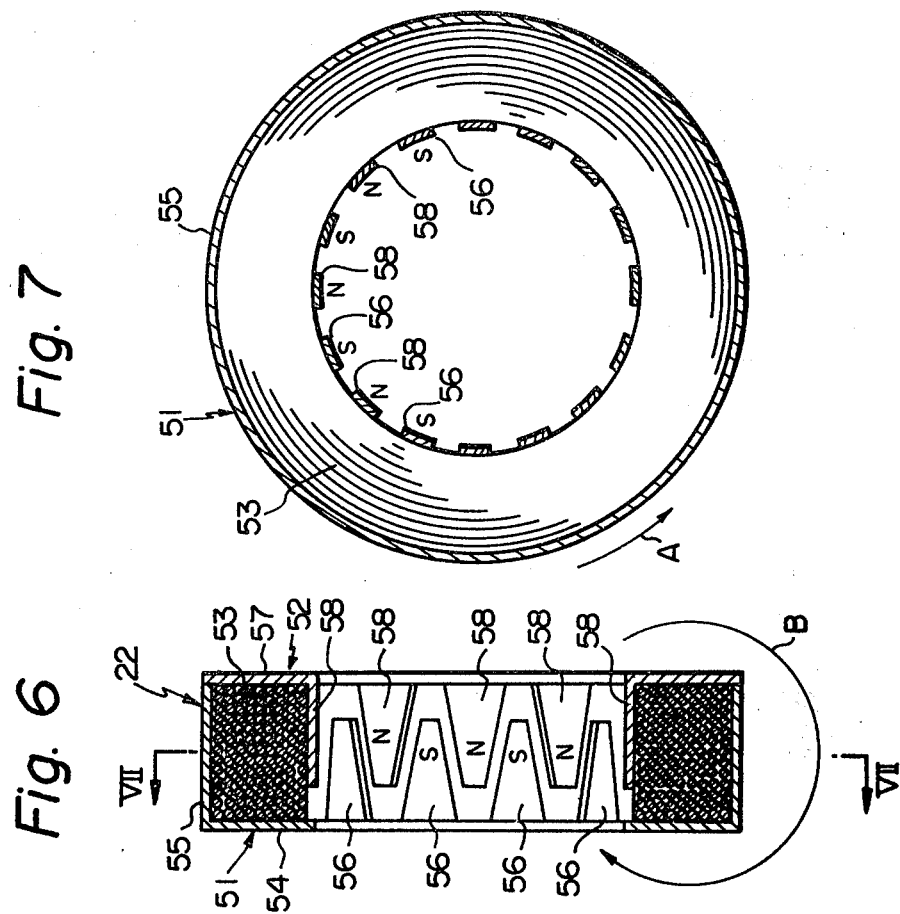

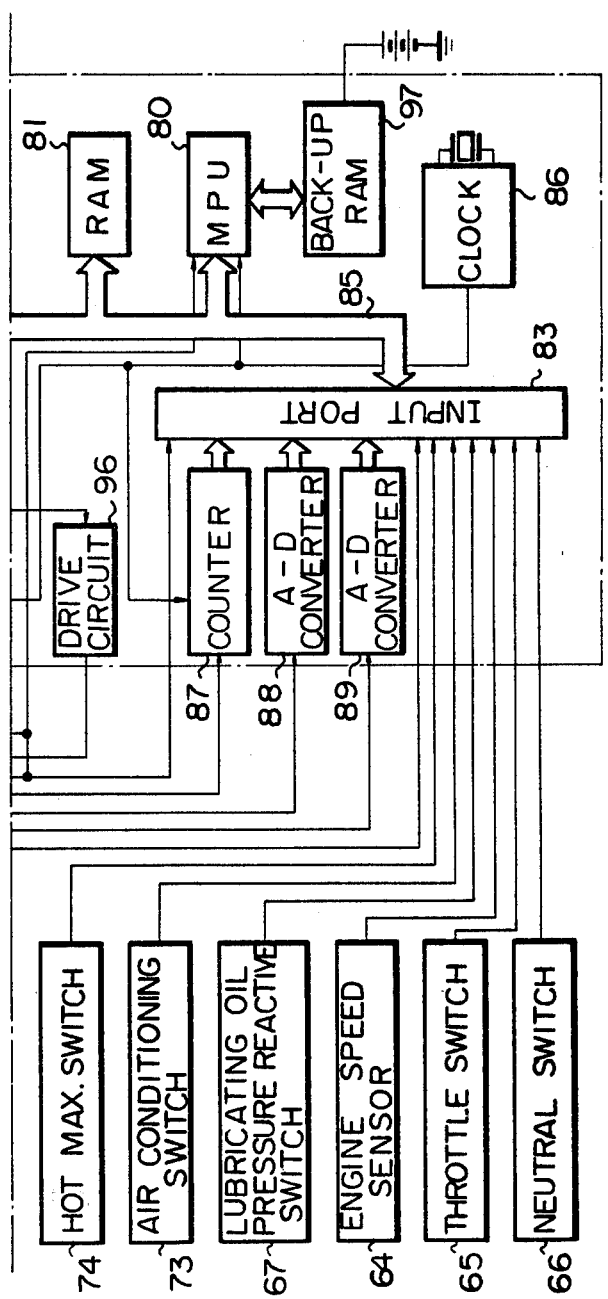

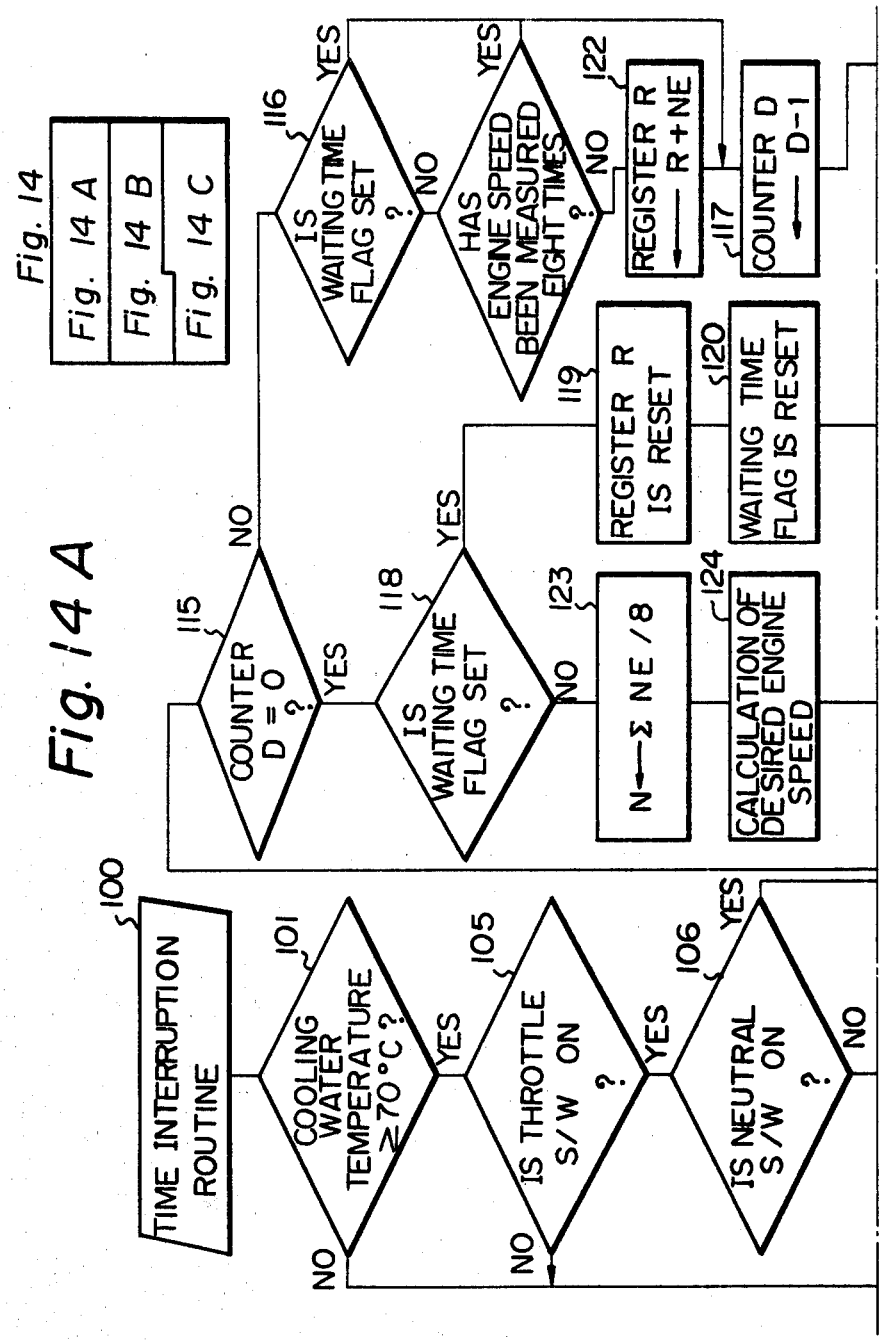

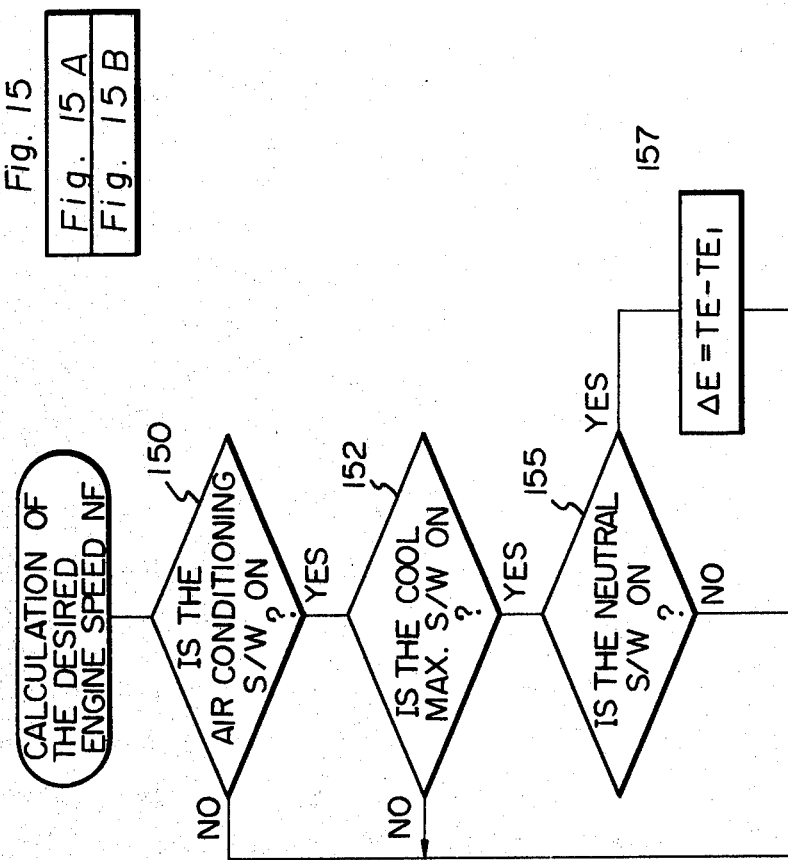

DEVICE OF CONTROLLING THE IDLING SPEED OF AN ENGINE

BACKGROUND OF THE INVENTION

The present invention relates to a device of controlling the idling speed of an internal combustion engine.

An idling speed control device has been known in which a bypass passage is branched off from the intake passage of an engine, which is located upstream of a throttle valve, and connected again to the intake passage located downstream of the throttle valve, and a diaphragm type vacuum operated control valve device is arranged in the bypass passage. The diaphragm vacuum chamber of the control valve device is connected via a vacuum conduit to the intake passage located downstream of the throttle valve, and an electromagnetic control valve is arranged in the vacuum conduit for controlling the cross-sectional area of the vacuum conduit. In this idling speed control device, at the time of idling, the level of the vacuum produced in the diaphragm vacuum chamber of the control valve device is controlled by controlling the electromagnetic control valve in accordance with the operating condition of the engine and, in addition, the air flow area of the bypass passage is controlled in accordance with a change in the level of the vacuum produced in the diaphragm vacuum chamber. As a result of this, the amount of air fed into the cylinders of the engine from the bypass passage is controlled. However, in such a conventional idling speed control device, firstly, in the case wherein a vehicle is used in a cold region, the electromagnetic control valve becomes frozen and, thus, it is impossible to control the cross-sectional area of the vacuum conduit. As a result of this, since it is also impossible to control air flow area of the bypass passage, a problem occurs in that it is impossible to control the amount of air fed into the cylinders from the bypass passage. Secondly, in a conventional idling speed control device, since the diaphragm type vacuum operated control valve device is used, the controllable range of the air flow area of the bypass passage is very narrow. Therefore, even if the control valve device is fully opened, air, the amount of which is necessary to operate the engine at the time of fast idling, cannot be fed into the cylinders of the engine from the bypass passage. Consequently, in a conventional idling speed control device, an additional bypass passage is provided in addition to the regular bypass passage, and a valve, which is actuated by a bimetallic element, is arranged in the additional bypass passage. When the temperature of the engine is low, the valve, which is actuated by the bimetallic element, opens. As a result of this, since additional air is fed into the cylinders of the engine from the additional bypass passage in addition to the air fed into the cylinders of the engine from the regular bypass passage, the amount of air, which is necessary to operate the engine at the time of fast idling, can be ensured. As mentioned above, in a conventional idling speed control device, since the additional bypass passage and the valve, actuated by the bimetallic element, are necessary in addition to the regular bypass passage, a problem occurs in that the construction of the idling speed control device will be complicated. In addition, since the amount of air fed into the cylinders of the engine is controlled by only the expanding and shrinking action of the bimetallic element at the time of fast idling, there is a problem in that it is impossible to precisely control the amount of air fed into the cylinders of the engine.

An object of the present invention is to provide a novel device of controlling the idling speed, which device is capable of precisely controlling the amount of air flowing within the bypass passage at the time of idling and maintaining the idling speed of the engine at an optimum speed.

According to the present invention, there is provided a device of controlling the idling speed of an engine of a vehicle having an air conditioning apparatus for cooling a driver's compartment, said engine comprising a main intake passage, a throttle valve arranged in the main intake passage, a bypass passage branched off from the main intake passage upstream of the throttle valve and connected to the main intake passage downstream of the throttle valve, a control valve arranged in the bypass passage, and a step motor actuating the control valve for controlling the amount of air flowing within the bypass passage, said air conditioning apparatus comprising an air duct which interconnects the driver's compartment to an exterior of the vehicle, a suction fan arranged in the air duct, an evaporator arranged in the air duct, a heat exchanger arranged in the air duct at a position located downstream of the evaporator, and an air mixture damper arranged in the air duct between the evaporator and the heat exchanger for controlling the amount of air directly flowing into the driver's compartment and for controlling the amount of air flowing into the driver's compartment via the heat exchanger, wherein said device comprises: first means for detecting the engine speed to produce a first signal indicating the engine speed; second means for detecting the operating condition of the engine to produce a second signal indicating that the engine is operating in an idling state; third means arranged in the air duct for producing a third signal indicating the temperature of air which has passed through the evaporator; fourth means cooperating with the air mixture damper for producing a fourth signal indicating that the entire air directly flows into the driver's compartment without passing through the heat exchanger, and; electronic control means in response to said first signal, said second signal, said third signal and said fourth signal for rotating the step motor in a rotating direction wherein the engine speed approaches a predetermined desired idling speed when the engine is operating in an idling state, said desired idling speed being increased when the temperature of air which has passed through the evaporator is higher than a predetermined temperature and when said fourth means produces said fourth signal.

The present invention may be more fully understood from the description of preferred embodiments of the invention set forth below, together with the accompanying drawings.

BRIEF DESCRIPTION OF THE DRAWINGS

In the drawings:

FIG. 6 is a cross-sectional side view of a stator;

FIG. 7 is a cross-sectional view taken along the line VII—VII in FIG. 6;

FIGS. 10a–10b are a circuit of an electric control unit;

FIGS. 14a–14c are a flow chart illustrating the general flow of the operation of an embodiment according to the present invention;

FIGS. 15a–15b are a flow chart illustrating the calculation of the desired engine speed in FIG. 14;

DESCRIPTION OF PREFERRED EMBODIMENTS

Figure 1:
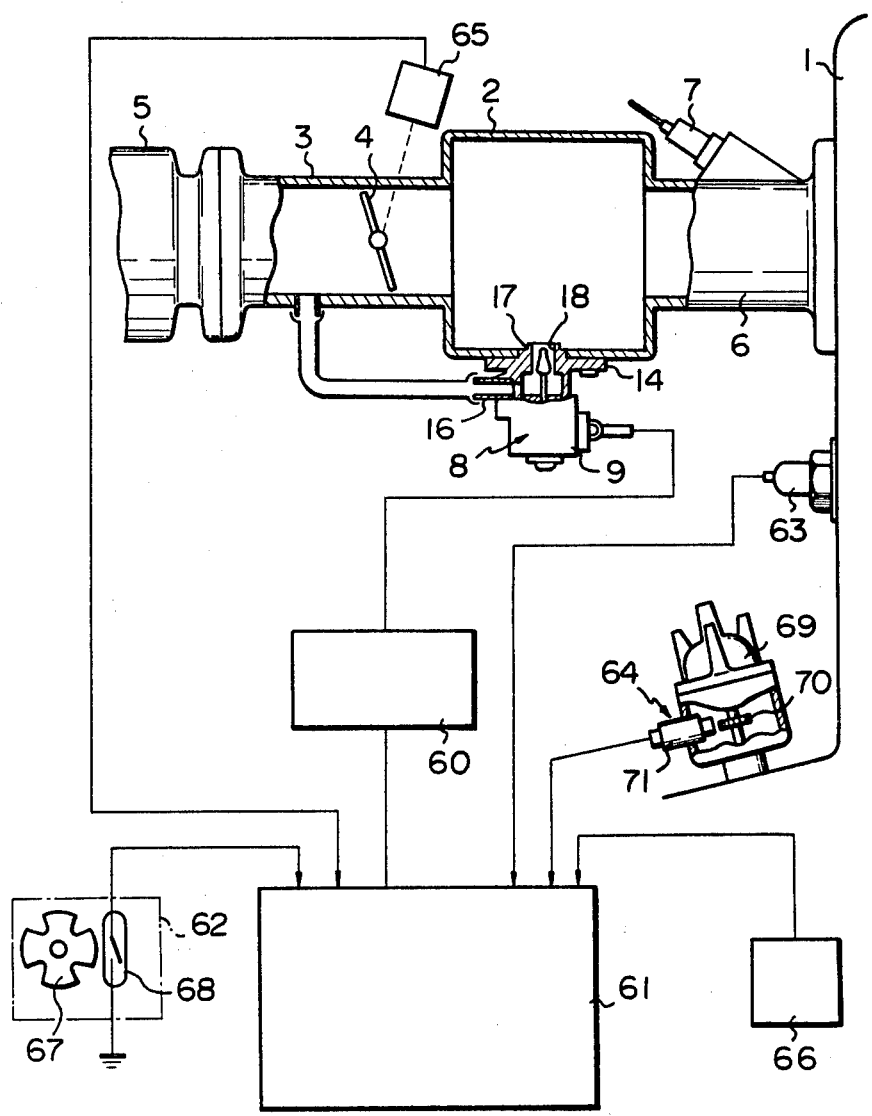
FIG. 1 is a side view, partly in cross-section, of an intake system equipped with an idling speed control device according to the present invention.
Figure 2:
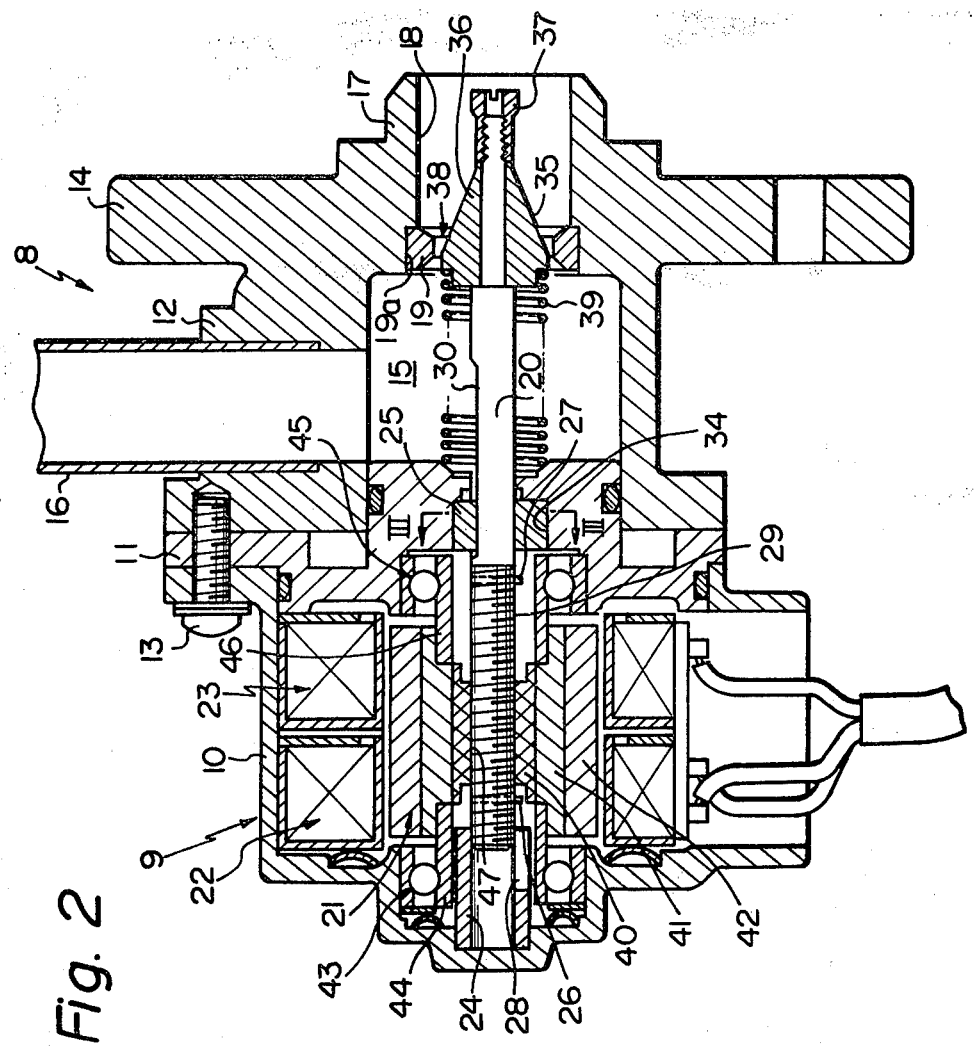
FIG. 2 is a cross-sectional side view of a flow control valve device.

Referring to FIG. 1, 1 designates an engine body, 2 a surge tank, 3 an intake duct, 4 a throttle valve and 5 an air flow meter. The inside of the intake duct 3 is connected to the atmosphere via the air flow meter 5 and an air cleaner (not shown). The surge tank 2, which is common to all the cylinders of the engine, has a plurality of branch pipes 6, each being connected to the corresponding cylinder of the engine. A fuel injector 7 is provided for each cylinder and mounted on the corresponding branch pipe 6. In addition, a flow control valve device 8 is mounted on the surge tank 2. As illustrated in FIG. 2, the flow control valve device 8 comprises a motor housing 10 of a step motor 9, a motor housing end plate 11 and a valve housing 12. The motor housing 10, the end plate 11 and the valve housing 12 are interconnected to each other by means of bolts 13. As illustrated in FIGS. 1 and 2, a flange 14 is formed in one piece on the valve housing 12 and fixed onto the outer wall of the surge tank 2. A valve chamber 15 is formed in the valve housing 12 and connected via a bypass pipe 16, fixed onto the valve housing 12, to the inside of the intake duct 3, which is located upstream of the throttle valve 4. In addition, a hollow cylindrical projection 17, projecting into the surge tank 2, is formed in one piece on the side wall of the flange 14, and a cylindrical air outflow bore 18 is formed in the hollow cylindrical projection 17. An annular groove 19a is formed on the inner end of the air outflow bore 18, and a valve seat 19 is fitted into the annular groove 19a.

Figure 3:
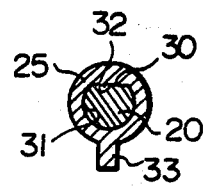
FIG. 3 is a cross-sectional view taken along the line III—III in FIG. 2.

As illustrated in FIG. 2, the step motor 9 comprises a valve shaft 20, a rotor 21 coaxially arranged with the valve shaft 20, and a pair of stators 22, 23, each being stationarily arranged in the motor housing 10 and spaced from the cylindrical outer wall of the rotor 21 by a slight distance. The end portion of the valve shaft 20 is supported by a hollow cylindrical bearing 24 made of a sintered metal and fixed onto the motor housing 10, and the intermediate portion of the valve shaft 20 is supported by a hollow cylindrical bearing 25 made of a sintered metal and fixed onto the end plate 11. A first stop pin 26, which abuts against the rotor 21 when the valve shaft 20 reaches the most advanced position, is fixed onto the valve shaft 20, and a second stop pin 27, which abuts against the rotor 21 when the valve shaft 20 reaches the most retracting position, is fixed onto the valve shaft 20. In addition, an axially extending slot 28, into which the first stop pin 26 is able to enter, is formed in the bearing 24. External screw threads 29 are formed on the outer circumferential wall of the valve shaft 20, which is located within the motor housing 10. The external screw threads 29 extend towards the right in FIG. 2 from the left end of the valve shaft 20 and terminate at a position wherein the valve shaft 20 passes through the second stop pin 27 by a slight distance. In addition, an axially extending flat portion 30, which extends towards the right in FIG. 2 from a position near the terminating position of the external screw threads 29, is formed on the outer circumferential wall of the valve shaft 20. As illustrated in FIG. 3, the inner wall of the shaft bearing hole of the bearing 25 comprises a cylindrical wall portion 31 and a flat wall portion 32 which have a complementary shape relative to the outer circumferential wall of the valve shaft 20. Consequently, the valve shaft 20 is supported by the bearing 25 so that the valve shaft 20 cannot be rotated, but is able to slide in the axial direction. In addition, as illustrated in FIG. 3, an outwardly projecting arm 33 is formed in one piece on the outer circumferential wall of the bearing 25, and a bearing receiving hole 34 (FIG. 2), having a contour shape which is the same as that of the bearing 25, is formed on the inner wall of the end plate 11. Consequently, when the bearing 25 is fitted into the bearing receiving hole 34, as illustrated in FIG. 2, the bearing 25 is non-rotatably supported by the end plate 11. A valve head 36, having a substantially conical shaped outer wall 35, is secured onto the tip of the valve shaft 20 by means of a nut 37, and an annular air flow passage 38 is formed between the valve seat 19 and the conical outer wall 35 of the valve head 36. In addition, a compression spring 39 is inserted between the valve head 36 and the end plate 11 in the valve chamber 15.

As illustrated in FIG. 2, the rotor 21 comprises a hollow cylindrical inner body 40 made of a synthetic resin, a hollow cylindrical intermediate body 41 made of a metallic material and rigidly fitted onto the outer circumferential wall of the hollow cylindrical inner body 40, and a hollow cylindrical outer body 42 made of a permanent magnet and fixed onto the outer circumferential wall of the hollow cylindrical intermediate body 41 by using an adhesive. As will be hereinafter described, an N pole and an S pole are alternately formed on the outer circumferential wall of the hollow cylindrical outer body 42 made of a permanent magnet along the circumferential direction of the outer circumferential wall of the hollow cylindrical outer body 42. As illustrated in FIG. 2, one end of the hollow cylindrical intermediate body 41 is supported by the inner race 44 of a ball bearing 43 which is supported by the motor housing 10, and the other end of the hollow cylindrical intermediate body 41 is supported by the inner race 46 of a ball bearing 45 which is supported by the end plate 11. Consequently, the rotor 21 is rotatably supported by a pair of the ball bearings 43 and 45. Internal screw threads 47, which are in engagement with the external screw threads 29 of the valve shaft 20, are formed on the inner wall of the central bore of the hollow cylindrical inner body 40. Therefore, when the rotor 21 rotates, the valve shaft 20 is caused to move in the axial direction.

The stators 22 and 23, which are stationarily arranged in the motor housing 10, have the same construction and, therefore, the construction of only the stator 22 will be hereinafter described with reference to FIGS. 4 through 7. Referring to FIGS. 4 through 7, the stator 22 comprises a pair of stator core members 51 and 52, and a stator coil 53. The stator core member 51 comprises an annular side wall portion 54, an outer cylindrical portion 55, and eight pole pieces 56 extending perpendicular to the annular side wall portion 54 from the inner periphery of the annular side wall portion 54. The pole pieces 56 have a substantially triangular shape, and each of the pole pieces 56 is spaced from the adjacent pole piece 56 by the same angular distance. On the other hand, the stator core member 52 comprises an annular side wall portion 57 and eight pole pieces 58 extending peripendicular to the annular side wall portion 57 from the inner periphery of the annular side wall portion 57. The pole pieces 58 have a substantially triangular shape, and each of the pole pieces 58 is spaced from the adjacent pole piece 58 by the same angular distance. The stator core members 51 and 52 are assembled so that each of the pole pieces 56 is spaced from the adjacent pole piece 58 by the same angular distance as illustrated in FIGS. 6 and 7. When the stator core members 51 and 52 are assembled, the stator core members 51 and 52 construct a stator core. When an electric current is fed into the stator coil 53 and flows within the stator coil 53 in the direction illustrated by the arrow A in FIG. 7, a magnetic field, the direction of which is as illustrated by the arrow B in FIG. 6, generates around the stator coil 53. As a result of this, the S poles are produced in the pole pieces 56 and, at the same time, the N poles are produced in the pole pieces 58. Consequently, it will be understood that an N pole and an S pole are alternately formed on the inner circumferential wall of the stator 22. On the other hand, if an electric current flows within the stator coil 22 in the direction which is opposite to that illustrated by the arrow A in FIG. 7, the N poles are produced in the pole pieces 56 and, at the same time, the S poles are produced in the pole pieces 58.

Figure 8:
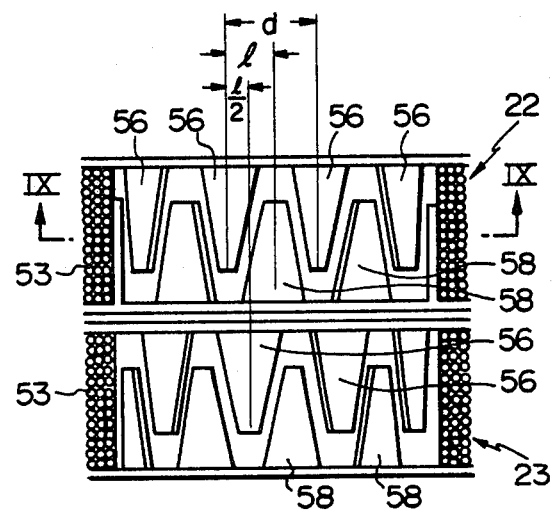
FIG. 8 is a cross-sectional plan view of the stator illustrated in FIG. 2.
Figure 9:
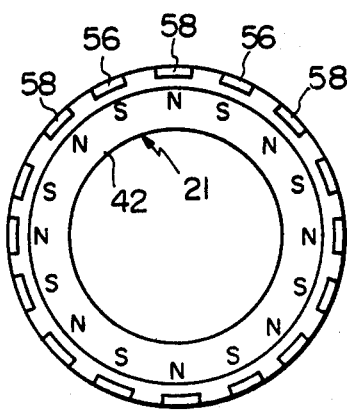
FIG. 9 is a schematic cross-sectional side view taken along the line IX—IX in FIG. 8.

FIG. 8 illustrates the case wherein the stators 22 and the stator 23 are arranged in tandem as illustrated in FIG. 2. In FIG. 8, similar components of the stator 23 are indicated with the same reference numerals used in the stator 22. As illustrated in FIG. 8, assuming that the distance between the pole piece 56 of the stator 22 and the adjacent pole piece 58 of the stator 22 is indicated by l, each of the pole pieces 56 of the stator 23 is offset by 1/2 from the pole piece 56 of the stator 22, which is arranged nearest to the pole pieces 56 of the stator 23. That is, assuming that the distance d between the adjacent pole pieces 56 of the stator 23 is one pitch, each of the pole pieces 56 of the stator 23 is offset by a ¼ pitch from the pole piece 56 of the stator 22, which is arranged nearest to the pole piece 56 of the stator 23. On the other hand, as illustrated in FIG. 9, the N pole and the S pole are alternately formed on the outer circumferential wall of the hollow cylindrical outer body 42 of the rotor 21 along the circumferential direction of the outer circumferential wall of the hollow cylindrical outer body 42. and the distance between the N pole and the S pole, which are arranged adjacent to each other, is equal to the distance between the pole piece 56 and the pole piece 58 of the stator 22 or 23, which are arranged adjacent to each other.

Turning to FIG. 1, the step motor 9 is connected to an electronic control unit 61 via a step motor drive circuit 60. In addition, a vehicle speed sensor 62, a cooling water temperature sensor 63, an engine speed sensor 64, a throttle switch 65, a neutral switch 66 of the automatic transmission (not shown) and a lubricating oil pressure reactive switch 67 are connected to the electronic control unit 61. The vehicle speed sensor 62 comprises, for example, a rotary permanent magnet 68 arranged in the speed meter (not shown) and rotated by the speed meter cable (not shown), and a reed switch 69 actuated by the rotary permanent magnet 68. A pulse signal, having a frequency which is proportional to the vehicle speed, is input into the electronic control unit 61 from the vehicle speed sensor 62. The cooling water temperature sensor 63 is provided for detecting the cooling water of the engine, and a signal, representing the temperature of the cooling water, is input into the electronic control unit 61 from the cooling water temperature sensor 63. The engine speed sensor 64 comprises a rotor 71 rotating in a distributor 70 in synchronization with the rotation of the crank shaft (not shown), and an electromagnetic pick-up 72 arranged to face the saw tooth shaped outer periphery of the rotor 71. A pulse is input into the electronic control unit 61 from the engine speed sensor 64 everytime the crank shaft rotates at a predetermined angle. The throttle switch 65 is operated by the rotating motion of the throttle valve 4 and turned to the ON position when the throttle valve 4 is fully closed. The operation signal of the throttle switch 65 is input into the electronic control unit 61. The neutral switch 66 is provided for detecting whether the automatic transmission is in the drive range D or in the neutral range N, and the detecting signal of the neutral switch 66 is input into the electronic control unit 61.

Figure 11:
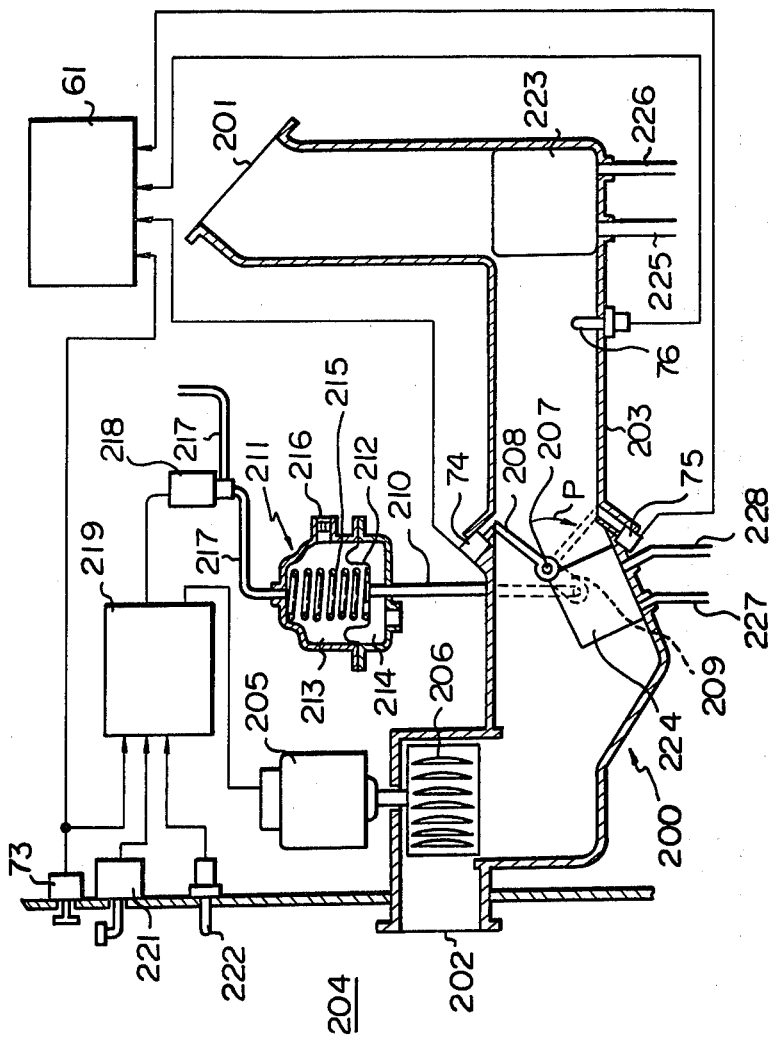
FIG. 11 is a schematic view of an air conditioning device.

FIG. 11 illustrates an air conditioning device 200. Referring to FIG. 11, the air conditioning device 200 comprises an air duct 203 having an air inlet 201 and an air outlet 202. The air inlet 201 is open to the atmosphere, and the air outlet 202 is open to a driver's compartment 204. A fan 206, driven by a motor 205, is arranged in the air duct 203 and, when the fan 206 is rotated, ambient air, sucked into the air duct 203 from the air inlet 201, is discharged into the driver's compartment 204 from the air outlet 202. In addition, an air mix damper 208, fixed onto a swing shaft 207, is arranged in the air duct 203. An arm 209 is fixed onto the swing shaft 207, and the tip of the arm 209 is connected to a diaphragm 212 of a vacuum diaphragm apparatus 211 via a control rod 210. The vacuum diaphragm apparatus 211 comprises a vacuum chamber 213 and an atmospheric pressure chamber 214 which are separated by a diaphragm 212, and a compression spring 215 for biasing the diaphragm 212 towards the atmospheric pressure chamber 214 is arranged in the vacuum chamber 213. The vacuum chamber 213 is connected, on one hand, to the atmosphere via a restricted opening 216 and, on the other hand, to the surge tank 2 (FIG. 1) via a vacuum conduit 217 and an electromagnetic valve 218. As illustrated in FIG. 11, the electromagnetic valve 218 is connected to the output terminal of an electronic control unit 219 for the air conditioning device 200. In addition, an air conditioning switch 73, a driver's compartment temperature setting device 221 and a driver's compartment temperature sensor 222 are connected to the input terminals of the electronic control unit 219. Continuous pulses are applied to the solenoid of the electromagnetic valve 218 from the electronic control unit 219, and the opening time duration of the electromagnetic valve 218 is increased as the duty cycle of the continuous pulses is increased. On the other hand, an evaporator 223 for cooling air and a heat exchanger 224 for heating air are arranged in the air duct 203. Coolant is fed via a coolant inflow conduit 225 into the evaporator 223 from a compressor (not shown) driven by the engine and, then, the coolant is returned to the compressor via a coolant outflow conduit 226 after the coolant absorbs heat from air flowing within the air duct 203. On the other hand, cooling water of the engine is fed into the heat exchanger 224 via a cooling water inflow conduit 227 and, then, the cooling water is returned to the radiator (not shown) via a cooling water outflow conduit 228 after the cooling water provides heat for air flowing within the air duct 203.

When the air conditioning switch 73 is turned to the ON position, the motor 225 is rotated, and the opening control of the electromagnetic valve 218 is started. As mentioned above, the opening time duration of the electromagnetic valve 218 is increased as the duty ratio of the continuous pulse applied to the electromagnetic valve 218 is increased. Consequently, the level of vacuum produced in the vacuum chamber 213 becomes great as the duty cycle of the continuous pulses is increased. If the level of vacuum produced in the vacuum chamber 213 becomes great, since the diaphragm 212 moves upwards against the compression spring 215, the air mix damper 208 is rotated in the direction illustrated by the arrow P in FIG. 11. As a result of this, since the amount of air passing through the heat exchanger 224 is reduced, the temperature of air fed into the driver's compartment 204 becomes low. Contrary to this, if the duty cycle of the continuous pulses applied to the electromagnetic valve 218 is reduced, since the opening time duration of the electromagnetic valve 218 is reduced, the level of vacuum produced in the vacuum chamber 213 becomes small. As a result of this, since the diaphragm 212 moves downwards, the air mix damper 208 is rotated in the direction which is opposite to the direction P. Therefore, since the amount of air passing through the heat exchanger 224 is increased, the temperature of air fed into the driver's compartment 204 is increased. The position of the air mix damper 208 is controlled by the driver's compartment temperature setting device 221 so that the temperature in the driver's compartment 204, which is set by the driver, becomes equal to the actual temperature in the driver's compartment 204, which is detected by the driver's compartment temperature sensor 222.

As illustrated in FIG. 11, a hot max. switch 74 and a cool max. switch 75 are arranged in the air duct 203. When the air mix damper 208 is located at a position illustrated by the solid line in FIG. 11, the hot max. switch 74 comes into engagement with the air mix damper 208 and is turned to the ON position. When the air mix damper 208 is located in the position illustrated by the solid line in FIG. 11, the entire air, flowing within the air duct 203, passes through the heat exchanger 224. Consequently, when air, fed into the driver's compartment 204 via the air duct 203, is heated to the maximum, the hot max. switch 74 is turned to the ON position. At this time, the evaporator 223 serves to dehumidify air flowing within the air duct 203. On the other hand, when the air mix damper 208 is located in the position illustrated by the broken line in FIG. 11, the cool max. switch 75 comes into engagement with the air mix damper 208 and is turned to the ON position. When the air mix damper 208 is located in the position illustrated by the broken line in FIG. 11, the entire air, flowing within the air duct 203, is cooled by the evaporator 223 without being heated by the heat exchanger 224. Consequently, when air, fed into the driver's compartment 204 via the air duct 203, is cooled to the maximum, the cool max. switch 75 is turned to the ON position. In addition, a temperature sensor 76 for detecting the temperature of air which has passed through the evaporator 223 is arranged in the air duct 203 at a position located near and downstream of the evaporator 223. As illustrated in FIG. 11, the air conditioning switch 73, the hot max. switch 74, the cool max. switch 75 and the temperature sensor 76 are connected to the electronic control unit 61.

Figure 10A:
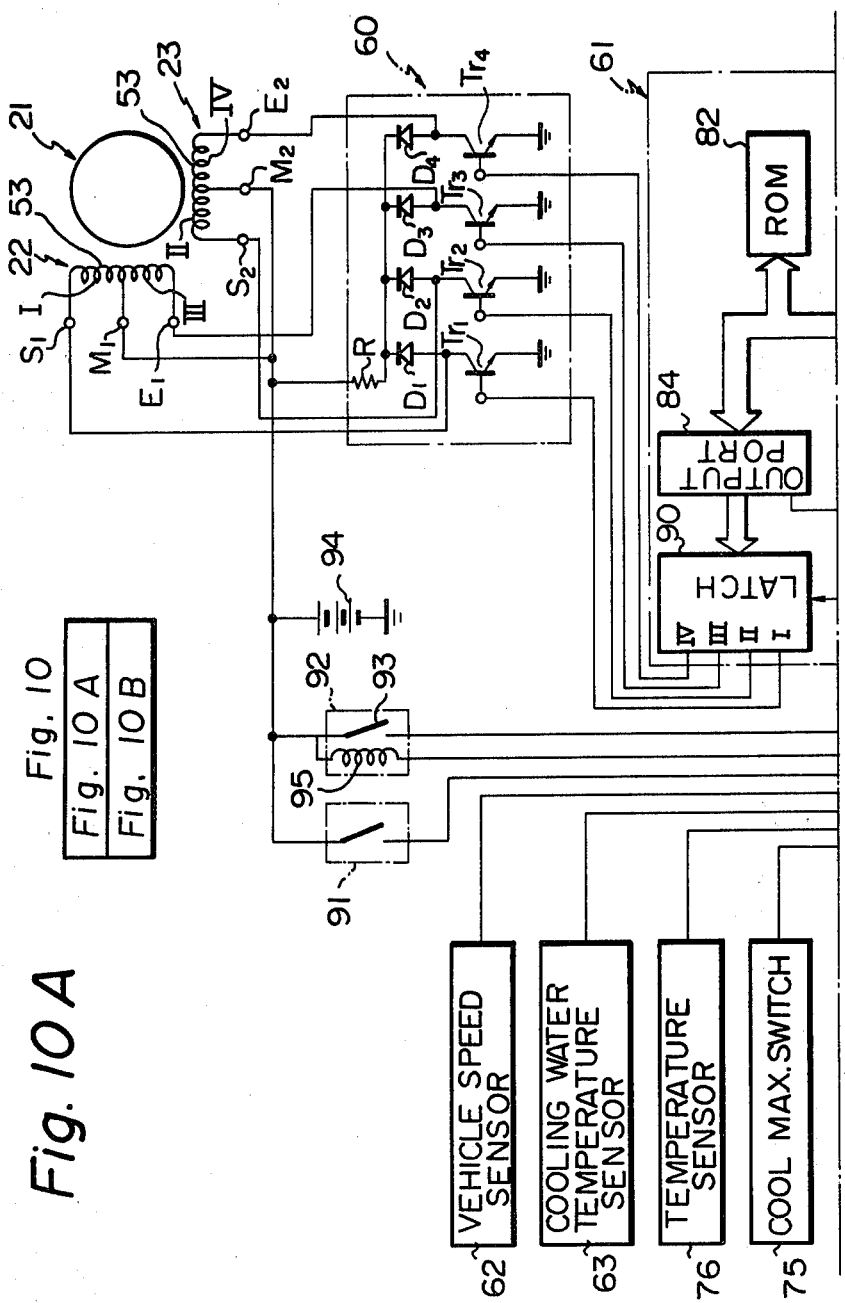

FIG. 10 illustrates the step motor drive circuit 60 and the electronic control unit 61. Referring to FIG. 10, the electronic control unit 61 is constructed as a digital computer and comprises a microprocessor (MPU) 80 executing the arithmetic and logic processing, a random-access memory (RAM) 81, a read-only memory (ROM) 82 storing a predetermined control program and an arithmetic constant therein, an input port 83 and an output port 84 are interconnected to each other via a bidirectional bus 85. In addition, the electronic control unit 61 comprises a clock generator 68 generating various clock signals. Furthermore, the electronic control unit 61 comprises a counter 87, and the vehicle speed sensor 62 is connected to the input port 83 via the counter 87. The number of output pulses, issued from the vehicle speed sensor 62, is counted for a fixed time period in the counter 87 by the clock signal of the clock generator 86, and the binary coded count value, which is proportional to the vehicle speed, is input into the MPU 80 via the input port 83 and the bus 85 from the counter 87. In addition, the electronic control unit 61 comprises a pair of A-D converters 88, 89. The cooling water temperature sensor 63 is connected to the input port 83 via the A-D converter 88, and the temperature sensor 76 is connected to the input port 83 via the A-D converter 89. The cooling water temperature sensor 63 comprises, for example, a thermistor element and produces output voltage which is proportional to the temperature of the cooling water of the engine. The output voltage of the cooling water temperature sensor 63 is converted to the corresponding binary code in the A-D converter 88, and the binary code is input into the MPU 80 via the input port 83 and the bus 85. The temperature sensor 76 also comprises, for example, a thermistor element and produces output voltage which is proportional to the temperature of air flowing within the air duct 203 located downstream of the evaporator 223. The output voltage of the temperature sensor 76 is converted to the corresponding binary code in the A-D converter 89, and the binary code is input into the MPU 80 via the input port 83 and the bus 85. The output signals of the cool max. switch 75, the hot max. switch 74, the air conditioning switch 73, the lubricating oil pressure reactive switch 67, the engine speed sensor 64, the throttle switch 65 and the neutral switch 66 are input into the MPU 80 via the input port 83 and the bus 85. In the MPU 80, the time interval of the output pulses issuing from the engine speed sensor 64 is calculated, and the engine speed is calculated from the time interval. On the other hand, the output terminals of the output port 84 are connected to the corresponding input terminals of the latch 90, and the output terminals of the latch 90 are connected to the step motor drive circuit 60. Step motor drive data, obtained in the MPU 80, is written in the output port 84, and the step motor drive data is retained in the latch 90 for a fixed time period by the clock signal of the clock generator 86. The power source terminal of the electronic control unit 61 is connected to a power source 94 via an ignition switch 91 and the switch 93 of a relay 92, which are arranged in parallel. The switch 93 is actuated by the coil 95 of the relay 92. One of the ends of the coil 95 is connected to the power source 94, and the other end of the coil 95 is connected to the output port 84 via a drive circuit 96. In addition, the opening and closing operation of the ignition switch 91 is input into the MPU 80 via the input port 83 and the bus 85.

On the other hand, in FIG. 8, the stator coil 53 of the stator 22 is wound in the direction which is the same as the winding direction of the stator coil 53 of the stator 23. In FIG. 10, the winding start terminals of the stator coils 53 of the stators 22 and 23 are indicated by $S_1$ and $S_2$, respectively, and the winding end terminals of the stator coils 53 of the stators 22 and 23 are indicated by $E_1$ and $E_2$, respectively. In addition, in FIG. 10, the intermediate taps of the stator coils 53 of the stators 22 and 23 are indicated by $M_1$ and $M_2$, respectively. In the stator 22, the stator coil 53, located between the winding start terminal $S_1$ and the intermediate tap $M_1$, constructs a first phase exciting coil I, and the stator coil 53, located between the winding end terminal $E_1$ and the intermediate tap $M_1$, constructs a second phase exciting coil II. In addition, in the stator 23 the stator coil 53, located between the winding start terminal $S_2$ and the intermediate terminal $M_2$, constructs a third phase exciting coil III, and the stator coil 53, located between the winding end terminal $E_2$ and the intermediate tap $M_2$, constructs a fourth phase exciting coil IV. As illustrated in FIG. 10, the drive control circuit 60 comprises four transistors $Tr_1$, $Tr_2$, $Tr_3$ and $Tr_4$, and the winding start terminals $S_1$ and $S_2$ and the winding end terminals $E_1$ and $E_2$ are connected to the collectors of the transistor $Tr_1$, $Tr_2$, $Tr_3$ and $Tr_4$, respectively. In addition, the intermediate taps $M_1$ and $M_2$ are grounded via a power source 94. The collectors of the transistor $Tr_1$, $Tr_2$, $Tr_3$ and $Tr_4$ are connected to the power source 94 via corresponding diodes $D_1$, $D_2$, $D_3$ and $D_4$ for absorbing a surge current and via a resistor R, and the emitters of the transistor $Tr_1$, $Tr_2$, $Tr_3$ and $Tr_4$ are grounded. In addition, the bases of the transistors $Tr_1$, $Tr_2$, $Tr_3$ and $Tr_4$ are connected to the corresponding output terminals of the latch 90.

Figure 12:
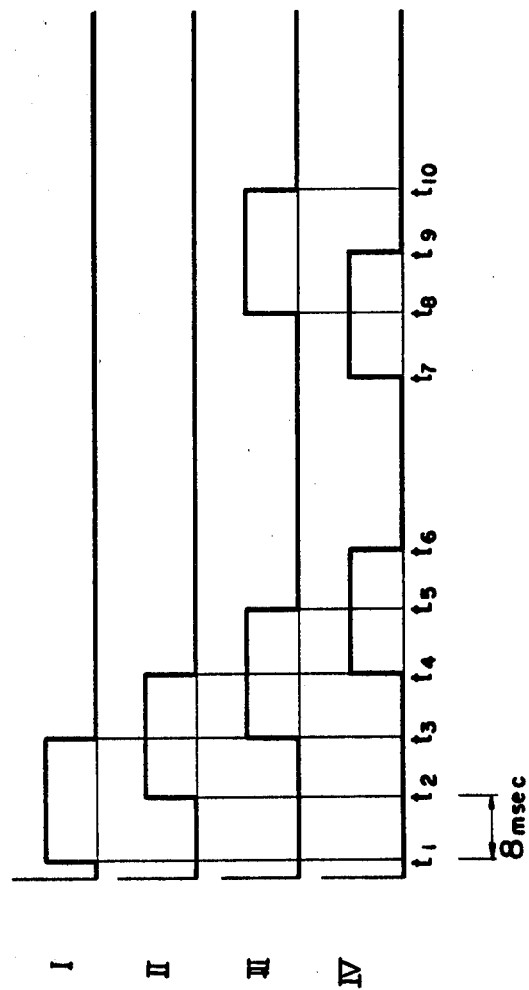
FIG. 12 is a time chart of control pulses of step motor.

As mentioned above, in the MPU 80, the engine speed is calculated on the basis of the output pulses of the engine speed sensor 64. On the other hand, a function, representing a desired relationship between, for example, the temperature of the cooling water of the engine and the engine speed, is stored in the ROM 82 in the form of a formula or a data table. In the MPU 80, the rotating direction of the step motor 9, which is necessary to equalize the engine speed to a predetermined engine speed, is determined from the above-mentioned function and the engine speed at which the engine is now driven and, in addition, a step motor drive data, which is necessary to rotate the step motor 9 in a stepping manner in the above-mentioned rotating direction, is obtained. Then, the step motor drive data is written in the output port 84. This writing operation of the step motor drive data is executed, for example, every 8 msec, and the step motor drive data, written in the output port 84, is retained in the latch 90 for 8 msec. For example, four bits drive data "1000" is input to the output port 84 from the MPU 80 and, if the output terminals of the latch 90, which are connected to the transistors $Tr_1$, $Tr_2$, $Tr_3$ and $Tr_4$, are indicated by I, II, III and IV, respectively, the output signals "1", "0", "0" and "0" are produced at the output terminals I, II, III and IV of the latch 90, respectively, for 8 msec. FIG. 12 illustrates output signals produced at the output terminals I, II, III, IV of the latch 90. From FIG. 12, it will be understood that, during the time period from the time $t_1$ to the time $t_2$, the output signals "1", "0", "0" and "0" are produced at the output terminals I, II, III and IV of the latch 90, respectively. When the output signal, produced at the output terminal I of the latch 90, becomes "1", since the transistor $Tr_1$ is turned to the ON condition, the first phase exciting coil I is excited. Then, at the time $t_2$ in FIG. 12, if it is determined in the MPU 80 that the step motor 9 should be moved by one step in the direction wherein the valve body 36 (FIG. 2) opens, the step motor drive data "1100" is written in the output port 84. As a result of this, as illustrated in FIG. 12, during the time period from the time $t_2$ to the time $t_3$, the output signals "1", "1", "0" and "0" are produced at the output terminals I, II, III and IV of the latch 90, respectively. Consequently, at this time, the transistor $Tr_2$ is also turned to the ON condition and, thus, the second phase exciting coil II is excited. As in the same manner as described above, during the time period from the time $t_3$ to the time $t_4$ in FIG. 12, since the output signals "0", "1", "1" and "0" are produced at the output terminals I, II, III and IV of the latch 90, respectively, the second phase exciting coil II and the third phase exciting coil III are excited and, during the time period from the time $t_4$ to the time $t_5$ in FIG. 12, since the output signals "0", "0", "1" and "1" are produced at the output terminals I, II, III and IV of the latch 90, respectively, the third phase exciting coil III and the fourth phase exciting coil IV are excited. From FIG. 12, it will be understood that the time duration necessary for the production of the output signals produced at the output terminals I, II, III, IV of the latch 90, that is, the length of time necessary to produce the exciting pulses applied to the exciting coils I, II, III, IV is the same, and that the each length of time necessary to produce the exciting pulses applied to the adjacent two phase exciting coils overlaps by one half as is shown in FIG. 12. An exciting system, in which the time periods of production of the exciting pulses applied to the adjacent two phase exciting coils are overlapped by one half, is called a two-phase exciting system.

Figure 13:
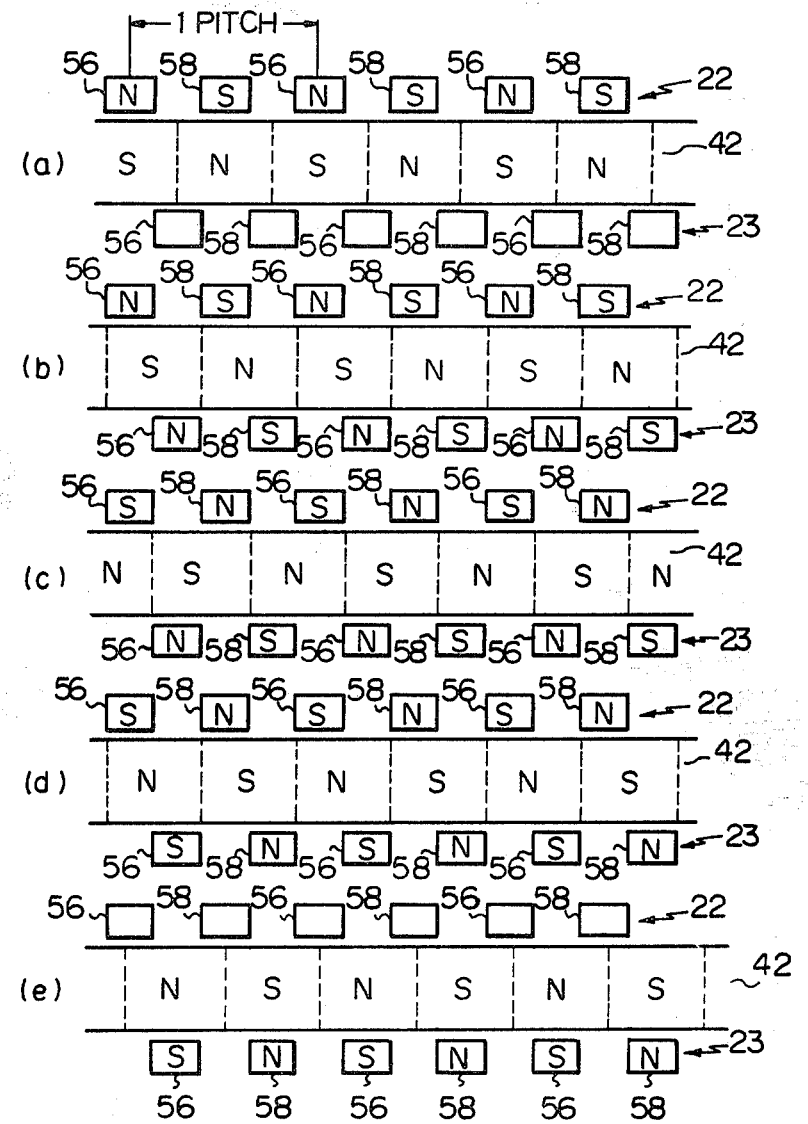
FIGS. 13a–13e are a schematically illustrative view of the stator and the rotor of a step motor.

FIG. 13 illustrated a schematic developed view of the outer circumferential surface of the hollow cylindrical outer body 42 of the rotor 21 and the pole pieces 56, 58 of the stators 22, 23. FIG. 13 (a) illustrates the case wherein only the first phase exciting coil I is excited as illustrated in FIG. 12 between the time $t_1$ and the time $t_2$. At this time, the polarity of the pole pieces 56 of the stator 22 is N, and the polarity of the pole pieces 58 of the stator 22 is S. Contrary to this, the polarity does not appear on the pole pieces 56, 58 of the stator 23. Consequently, at this time, the rotor 21 remains stopped at a position wherein each of the pole pieces 56 of the stator 22 faces the corresponding S pole of the hollow cylindrical outer body 42, and each of the pole pieces 58 of the stator 22 faces the corresponding N pole of the hollow cylindrical outer body 42. When the second phase exciting coil II is excited, as illustrated between the time $t_2$ and the time $t_3$ in FIG. 12, since the flow direction of the current in the secondary phase exciting coil II is the same as that of the current in the first phase exciting coil I, the polarity of the pole pieces 56 of the stator 23 becomes N, and the polarity of the pole pieces 58 of the stator 23 becomes S, as illustrated in FIG. 13 (b). Consequently, at this time, the hollow cylindrical outer body 42 moves to a position wherein each of the S poles of the hollow cylindrical outer body 42 is located between the corresponding pole pieces 56 of the stator 22 and the corresponding pole pieces 56 of the stator 23, and each of the N poles of the hollow cylindrical outer body 42 is located between the corresponding pole pieces 58 of the stator 22 and the corresponding pole pieces 58 of the stator 23. Therefore, assuming that the distance between the adjacent two pole pieces 56 of the stator 22 is one pitch, as mentioned previously, the hollow cylindrical outer body 42 moves by a $\frac{1}{4}$ pitch towards the right in FIG. 13 from a position illustrated in FIG. 13 (a) to a position illustrated in FIG. 13 (b).

After this, when the third phase exciting coil III is excited, as illustrated between the time $t_3$ and the time $t_4$ in FIG. 12, since the flow direction of the current in the third phase exciting coil III is opposite to that of the current in the first phase exciting coil I, the polarity of the pole pieces 56 of the stator 22 becomes S, and the polarity of the pole pieces 58 of the stator 22 becomes N as illustrated in FIG. 13 (c). As a result of this, the hollow cylindrical outer body 42 moves by a $\frac{1}{4}$ pitch towards the right in FIG. 13 from a position illustrated in FIG. 13 (b) to a position illustrated in FIG. 13 (c). In the same manner as described above, when the fourth phase exciting coil IV is excited, as illustrated between the time $t_4$ and the time $t_5$ in FIG. 12, the hollow cylindrical outer body 42 moves by a $\frac{1}{4}$ pitch towards the right in FIG. 13 from a position illustrated in FIG. 13 (c) to a position illustrated in FIG. 13 (d). After this, during the time period from the time $t_5$ to the time $t_6$, only the fourth phase exciting coil IV is excited and, thus, the polarity does not appear on the pole pieces 56, 58 of the stator 22 as illustrated in FIG. 13 (e). Consequently, at this time, the hollow cylindrical outer body 42 moves by a $\frac{1}{8}$ pitch towards the right in FIG. 13 from a position illustrated in FIG. 13 (d) to a position illustrated in FIG. 13 (e), so that each of the pole pieces 56 of the stator 23 faces the corresponding N pole of the hollow cylindrical outer body 42, and each of the pole pieces 58 of the stator 23 faces the corresponding S pole of the hollow cylindrical body 42. Then, at the time $t_6$ in FIG. 12, the step motor drive data "0000" is written in the output port 84 and, thus, since all the output signals, produced at the output terminals I, II, III, IV of the latch 90, become "0", the exciting operation of all the exciting coils I, II, III, IV is stopped. At this time, as illustrated in FIG. 13 (e), each of the pole pieces 56 of the stator 23 faces the corresponding N pole of the hollow cylindrical outer body 42, and each of the pole pieces 58 of the stator 23 faces the corresponding S pole of the hollow cylindrical outer body 42. Consequently, the hollow cylindrical outer body 42 is stationarily retained at a position illustrated in FIG. 13 (e) due to the attracting forces of the N pole and the S pole of the hollow cylindrical outer body 42, which forces act on the pole pieces 56 and the pole pieces 58 of the stator 23, respectively. In addition, an exciting data, indicating that the fourth phase exciting coil IV is excited before the hollow cylindrical outer body 42 is stationarily retained as mentioned above, is stored in a predetermined address in the RAM 81.

At the time $t_7$ in FIG. 12, in the case wherein it is determined in the MPU 80 that the step motor 9 should be moved by one step in the direction wherein the valve body 36 (FIG. 2) opens, an exciting data, indicating the phase of the exciting coil which was finally excited, is read out from the RAM 81 and, if the phase of the exciting coil which was finally excited is the fourth phase, the step motor drive data "0001" is initially written in the output port 84. Consequently, only the fourth phase exciting coil IV is excited as illustrated between the time $t_7$ of the time $t_8$ in FIG. 12. At this time, since the hollow cylindrical outer body 42 is located in a position illustrated in FIG. 13 (e), the hollow cylindrical outer body 42 remains stationary. After this, when the third phase exciting coil III is excited as illustrated, between the time $t_8$ and the time $t_9$, the polarities, as illustrated in FIG. 13 (d) appear on the pole pieces 56, 58 of the stators 22, 23 and, thus, the hollow cylindrical outer body 42 moves by a $\frac{1}{8}$ towards the left in FIG. 13 from a position illustrated in FIG. 13 (e) to a position illustrated in FIG. 13 (d).

As illustrated between the time $t_1$ and the time $t_6$ in FIG. 12, when the exciting coils I, II, III, IV are successively excited from the first phase exciting coil I to the fourth phase exciting coil IV, the hollow cylindrical outer body 42 of the rotor 21 moves relative to the stators 22, 23 and, accordingly, the rotor 21 rotates in one direction. When the rotor 21 rotates, since the external screw threads 29 of the valve shaft 20 is in engagement with the internal screw threads 47 of the hollow cylindrical inner body 40, as illustrated in FIG. 2, the valve shaft 20 is caused to move in one direction, for example, towards the left in FIG. 2. As a result of this, since the cross-sectional area of the annular air flow passage 38 formed between the valve head 36 and the valve seat 19 is increased, in FIG. 1, the amount of air fed via the bypass pipe 16 into the surge tank 2 from the intake duct 3 located upstream of the throttle valve 4 is increased. Contrary to this, during the time period between the time $t_7$ and the time $t_{10}$, since the valve shaft 20 is caused to move towards the right in FIG. 2, the cross-sectional area of the annular air flow passage 38 formed between the valve head 36 and the valve seat 19 is reduced.

Figure 4:
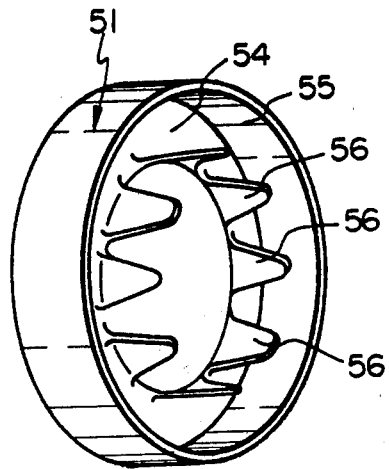
FIG. 4 is a perspective view of a stator core member.
Figure 5:
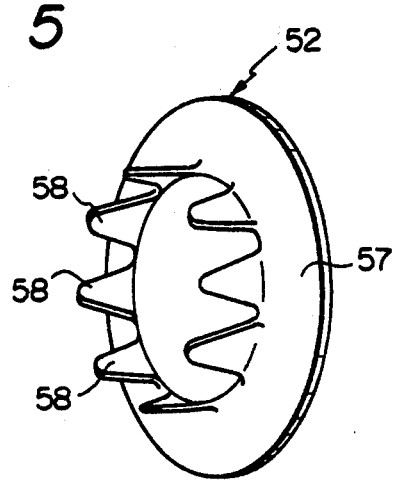
FIG. 5 is a perspective view of a stator core member.
Figure 14B:
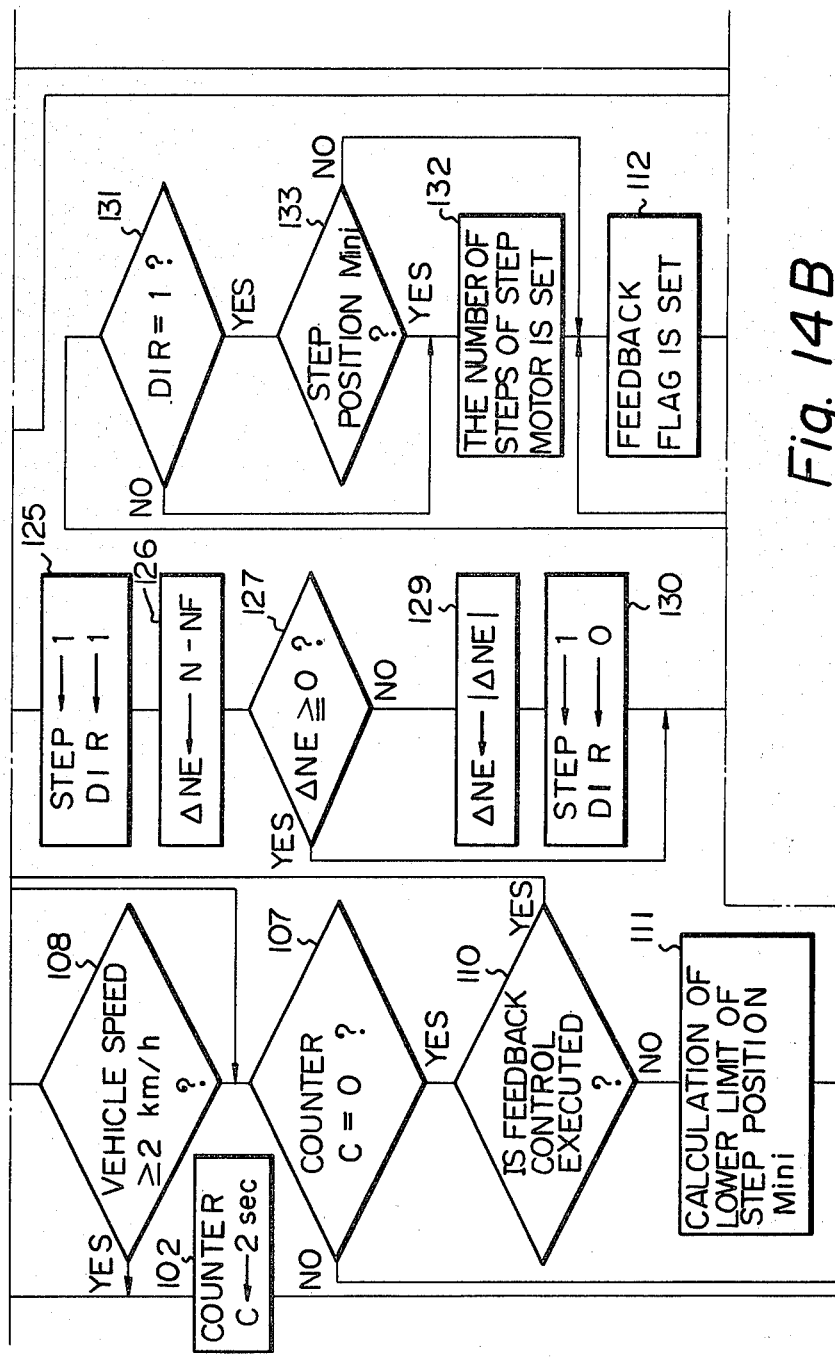
Figure 14C:
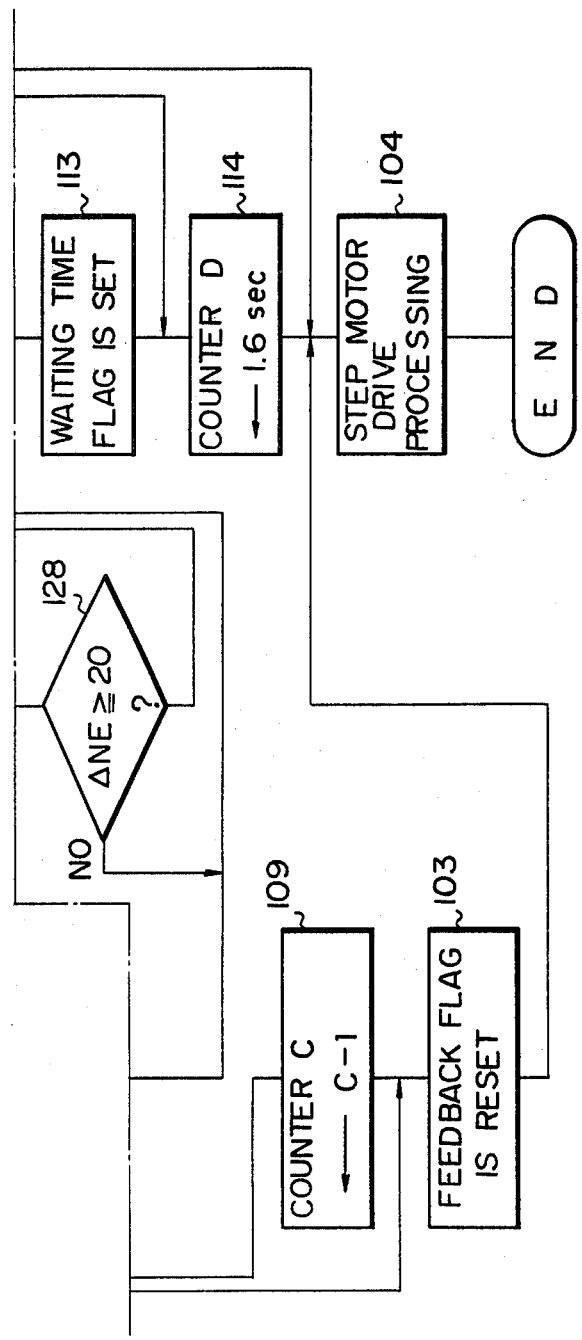

FIG. 4 illustrates a flow chart of the operation which is executed when the amount of air flowing within the bypass pipe 16 is controlled. In FIG. 14, step 100 means that the routine is processed by sequential interruptions which are executed periodically at predetermined times. This interruption is executed, for example, every 8 msec. Firstly, in step 101, the output signal of the cooling water temperature sensor 63 is input into the MPU 80 via the A-D converter 88 and the input port 83, and it is determined whether the temperature of the cooling water of the engine is not lower than 70° C. If it is determined in step 101 that the temperature of the cooling water of the engine is lower than 70° C., that is, before the warm-up of the engine is completed, the counter C is set by 2 sec in step 102. As mentioned above, since the interruptions are executed every 8 msec in the routine illustrated in FIG. 14, the operation of setting 2 sec means that numeral 250 (=2 sec/8 msec) is put into the counter C. Then, in step 103, the feedback flag, which is set during the time the feedback control is executed, is reset, and, then, in step 104, the step motor drive processing is executed. However, at this time, actually, the step motor 9 remains stationary. After this, the processing cycle is completed.

On the other hand, if it is determined in step 101 that the temperature of the cooling water of the engine is not lower than 70° C., it is determined in step 105 whether the throttle switch 65 is in the ON position, that is, whether the throttle valve 4 is fully closed. If it is determined in step 105 that the throttle switch 65 is not in the ON position, the routine goes to step 102 and, if it is determined in step 105 that the throttle switch 65 is in the ON position, the routine goes to step 106. In step 106, it is determined whether the neutral switch 66 is in the ON position, that is, whether the automatic transmission is in the neutral range. If it is determined in step 106 that the automatic transmission is in the neutral range, the routine jumps to step 107 and, if it is determined in step 106 that the automatic transmission is not in the neutral range, that is, in the drive range, the routine goes to step 108. In step 108, the output signal of the vehicle speed sensor 62 is input into the MPU 80 via the counter 87 and the input port 83, and it is determined whether the vehicle speed is not lower than 2 Km/h. If it is determined in step 108 that the vehicle speed is not lower than 2 Km/h, the routine goes to step 102 and, if it is determined in step 108 that the vehicle speed is lower than 2 Km/h, the routine goes to step 107. Consequently, the routine goes to step 107 only in the following two cases (1) and (2), and the routine goes to step 102 in all other cases.

(1) The temperature of the cooling water of the engine is not lower than 70° C.; the throttle valve 4 is fully closed, and; the automatic transmission is in the neutral range.

(2) The temperature of the cooling water of the engine is not lower than 70° C.; the throttle valve 4 is fully closed, and; the automatic transmission is in the drive range, and; the vehicle speed is lower than 2 Km/h.

Figure 16:
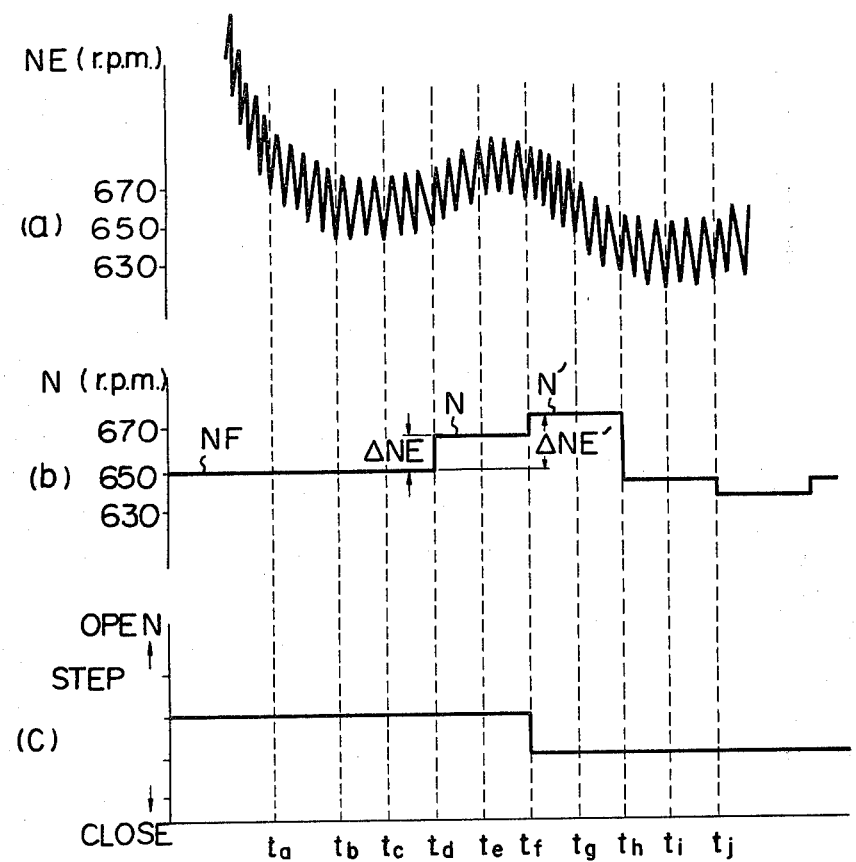
FIG. 16 is a diagram illustrating the relationship between the step position of a step motor and an engine sped.

It is considered that the above-mentioned two cases (1) and (2) indicate the idling operation of the engine. Consequently, in the case wherein the engine is operating not in an idling state, the counter C continues to be set by 2 sec in step 102 and, when the idling operation of the engine is started, the routine goes to step 107, and it is determined whether the content of the counter C is equal to zero. When the routine initially goes to step 07 after the idling operation is started, the content of the counter C is equal to 2 sec. Therefore, at this time, the routine jumps to step 109, and "C−1" is put into "C", that is, the content of the counter C is decremented by one. After this, in step 103, the feedback flag is reset and, then, in step 104, the step motor drive processing is executed. However, at this time, actually, the step motor 9 remains stationary. Then, the processing cycle is completed. Since the content of the counter C is decremented by one everytime the routine goes to step 109 as mentioned above, when 2 sec has elapsed after the idling operation of the engine is started, it is determined in step 107 that the content of the counter C is equal to zero and, thus, the routine goes to step 110. That is, in FIG. 16, if the idling operation of the engine is started at the time $t_a$, the content of the counter C becomes equal to zero at the time $t_b$ after 2 sec from the time $t_a$ and, thus, the routine goes to step 110. In FIG. 16, the ordinate of FIG. 16 (a) indicates the engine speed NE (r.p.m.); the ordinate of FIG. 16 (b) indicates the mean value N (r.p.m.) of the engine speed NE (r.p.m.), and; the ordinate of FIG. 16 (c) indicates the step position STEP of the step motor 9. This step position STEP is so defined that the step position STEP, in which the valve head 36 (FIG. 2) is fully closed, is a reference step position "0", and that the number of the step position STEP is successively incremented by one as the valve head 36 is opened.

Figure 17:
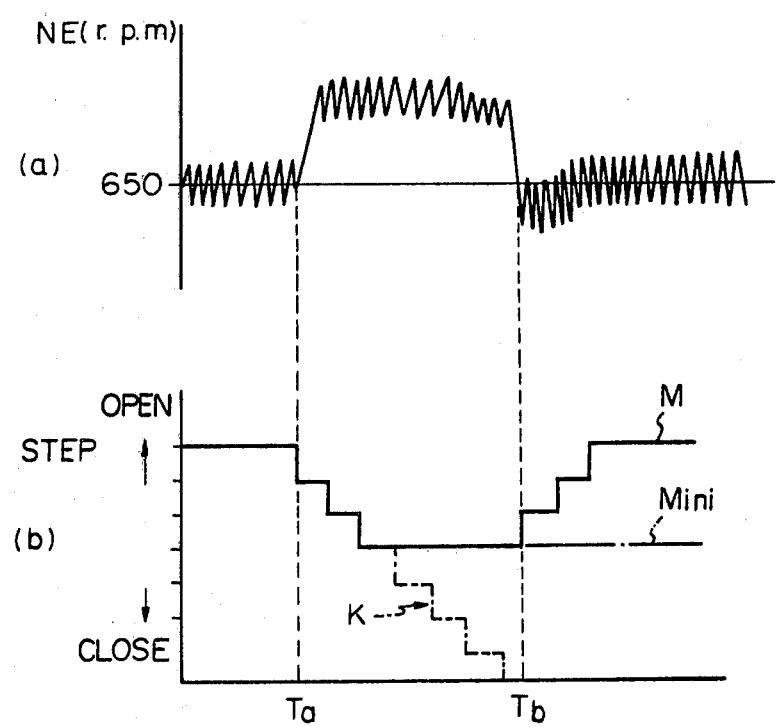
FIG. 17 is a diagram also illustrating the relationship between the step position of a step motor and the engine speed.

Turning to FIG. 14, in step 110, it is determined whether the feedback flag has been set. When the routine initially goes to step 110, since the feedback flag has been reset in step 103, it is determined in step 110 that the feedback flag has been set and, thus, the routine goes to step 111. In step 111, the lower limit Mini of the step position STEP is calculated. This lower limit Mini of the step position STEP is a step position STEP obtained by subtracting numeral 3 from the mean value of the step positions STEP which have been measured for a long time when the idling operation was carried out. In order to always store the mean value of the step positions STEP which have been measured for a long time when the idling operation was carried out, a back-up RAM 97 is provided as illustrated in FIG. 10. The lower limit Mini of the step position STEP will be hereinafter described with reference to FIG. 17. In FIG. 17, the ordinate of FIG. 17 (a) indicates the engine speed NE (r.p.m.), and the ordinate of FIG. 17 (b) indicates the step position STEP of the step motor 9. The throttle switch 65, for detecting that the throttle valve 4 is in the fully closed position, is so constructed that the throttle switch 65 is operated before the throttle valve 4 is fully closed. Therefore, even if the throttle valve 4 is slightly opened, the throttle switch 65 is in the ON position. In FIG. 17, assuming that the throttle valve 4 is in the fully closed position until the time $T_a$, and that the throttle valve 4 is slightly opened at the time $T_a$, since the amount of air fed into the cylinder of the engine is increased after the time $T_a$, the engine speed NE is increased as illustrated in FIG. 17 (b). If the engine speed NE is increased as mentioned above, as illustrated by K in FIG. 17 (b), the step motor 9 continues to be driven in a rotating direction which causes the valve head 36 (FIG. 2) to close in order to reduce the engine speed NE by reducing the amount of air fed into the cylinder. Then, assuming that the throttle valve 4 is again fully closed at the time $T_b$, since the opening degree of the valve head 36 is rather small, the amount of air fed into the cylinder is rather small. As a result of this, a problem occurs in that the engine stall will take place. In the present invention, in order to prevent the engine stall from taking place, the step motor 9 is so controlled that the step position STEP of the step motor 9 becomes not smaller than the above-mentioned lower limit Mini. Consequently, even if the throttle valve 4 is slightly opened at the time $t_a$ in FIG. 17. The step motor 9 is rotated only by 3 steps as illustrated by the solid line in FIG. 17 (b). Therefore, when the throttle valve 4 is again fully closed at the time $T_b$, since the amount of air fed into the cylinder is not small, it is possible to prevent the engine stall from taking place.

After the lower limit Mini of the step position STEP is calculated in step 111, the feedback flag is set in step 112. After this, in step 113, the waiting time flag is set and, then, in step 114, the counter D is set by 1.6 sec, that is, numeral 200 (=1.6 sec/8 msec) is put into the counter D. Then, the step motor drive processing is executed in step 104. However, at this time, actually, the step motor 9 remains stationary. After this, the processing cycle is completed.

When the routine goes to step 110 for the second time, since the feedback flag has been set in step 112 in the preceding processing cycle, it is determined in step 110 that the feedback flag has been set and, thus, the routine goes to step 115. When the routine initially goes to step 115, since the content of the counter D is equal to 200, it is determined in step 115 that the content of the counter D is not equal to zero and, thus, the routine goes to step 116. In step 116, it is determined whether the waiting time flag has been set. Since the waiting time flag has been set in step 113 in the preceding processing cycle, it is determined in step 116 that the waiting time flag has been set and, thus, the routine jumps to step 117. In step 117, "D−1" is put into "D", that is, the content of the counter D is decremented by one and, then, in step 104, the step motor drive processing is executed. However, at this time, actually, the step motor 9 remains stationary. Since the content of the counter D is decremented by one everytime the routine goes to step 117, when 1.6 sec. has elapsed after the routine initially goes to step 117, it is determined in step 115 that the content of the counter D is equal to zero and, thus, the routine goes to step 118. This time is indicated by the time $t_c$ in FIG. 16. Consequently, in FIG. 16, the time duration between the time $t_b$ and the time $t_c$ corresponds to the waiting time 1.6 sec. In step 118, it is determined whether the waiting time flag has been set. At this time, since the waiting time flag has been set, the routine goes to step 119. In step 119, the register R for storing the engine speed NE is reset and, then, in step 120, the waiting time flag is reset. After this, in step 114, the counter D is again set by 1.6 sec and, then, the step motor drive processing is executed in step 104. However, at this time, actually, the step motor 9 remains stationary.

In the next processing cycle, in step 115, it is again determined whether the content of the counter D is equal to zero. At this time, since numeral 200 has been put into the counter D in step 114 in the preceding processing cycle, it is determined in step 115 that the content of the counter D is not equal to zero and, thus, the routine goes to step 116. In step 116, it is determined whether the waiting time flag has been set. At this time, since the waiting time flag has been reset in step 120 in the preceding processing cycle, it is determined in step 116 that the waiting time flag has not been set and, thus, the routine goes to step 121. As mentioned previously, in the MPU 80, the engine speed NE is calculated on the basis of the output signal of the engine speed sensor 64 and, in step 121, it is determined whether the engine speed NE has been measured eight times. If it is determined in step 121 that the engine speed NE is measured eight times, the routine jumps to step 117, and the content of the counter D is decremented by one. Contrary to this, if it is determined in step 121 that the engine speed NE has not been measured eight times, the engine speed NE is added to the content of the register R in step 122 and, then, in step 117, the content of the counter D is decremented by one. Since the routine goes to step 122 eight times, the sum of the engine speed NE which has been measured eight times is stored in the register R.

After this, when it is determined in step 115 that the content of the counter D is equal to zero, that is, when 1.6 sec has elapsed after the measuring operation of the engine speed NE is started, the routine goes to step 118. In step 118, it is determined whether the waiting time flag has been set. At this time, since the waiting time flag has been reset, it is determined in step 118 that the waiting time flag has not been set and, thus, the routine goes to step 123. In step 123, the sum of the engine speed ΣNE which has been measured eight times and has been stored in the register R is divided by 8, and the result of the division is put into N. Consequently, this N indicates the mean value of the engine speed NE which has been measured eight times. Then, in step 124, the desired engine speed NF is calculated.

Figure 15B:
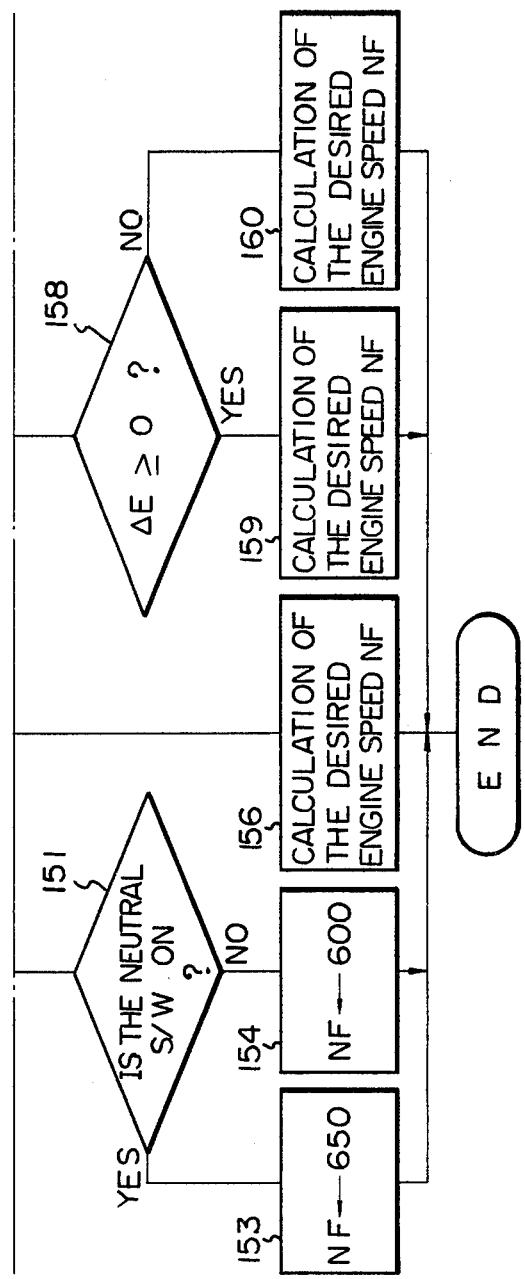

FIG. 15 illustrates a flow chart for calculating the desired engine speed NF. Referring to FIG. 15, in step 150, it is deterined whether the air conditioning switch 73 is in the ON position on the basis of the output signal of the air conditioning switch 73. If it is determined in step 150 that the air conditioning switch 73 is not in the ON position, the routine goes to step 151 and, if the air conditioning switch 73 is in the ON position, the routine goes to step 152. In step 152, it is determined whether the cool max. switch 75 is in the ON position on the basis of the output signal of the coal max. switch 75. If it is determined in step 152 that the cool max. switch 75 is not in the ON position, the routine goes to step 151. In step 151, it is determined whether the neutral switch 66 is in the ON position on the basis of the output signal of the neutral switch 66. If it is determined in step 151 that the neutral switch 66 is in the ON position, that is, if the automatic transmission is in the neutral range, the routine goes to step 153, and the data 650 r.p.m. is put into the desired engine speed NF. Contrary to this, if it is determined in step 151 that the neutral switch 66 is not in the ON position, that is, if the automatic transmission is in the drive range, the routine goes to step 154, and the data 600 r.p.m. is put into the desired engine speed NF.

Figure 18:
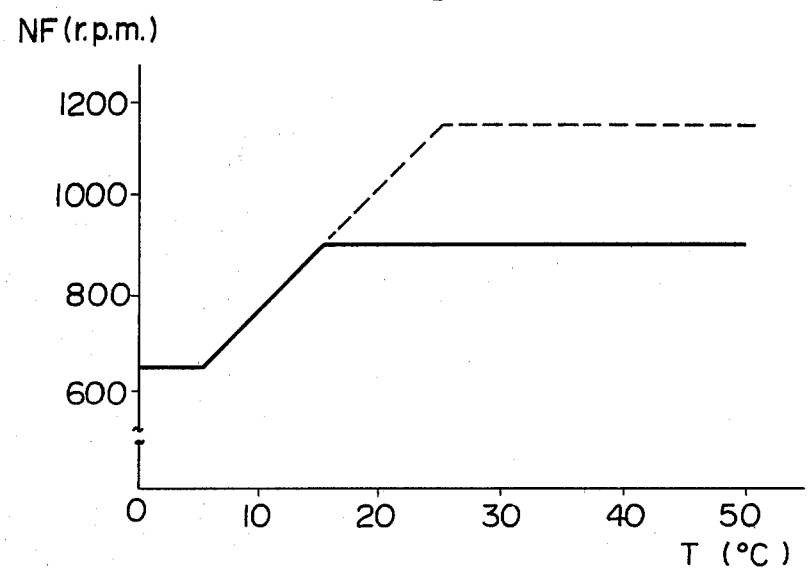
FIG. 18 is a diagram illustrating the relationship between the desired engine speed and the temperature of air which has passed through the evaporator when the automatic transmission is in a neutral range.
Figure 19:
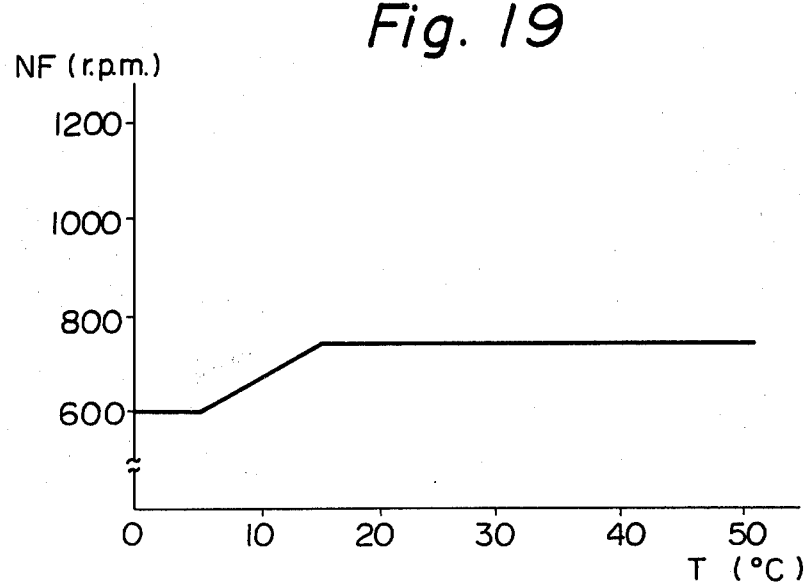
FIG. 19 is a diagram illustrating the relationship between the desired engine speed and the temperature of air which has passed through the evaporator when the automatic transmission is in a drive range.

On the other hand, if it is determined in step 152 that the cool max. switch 75 is in the ON position, the routine goes to step 155. Consequently, the routine goes to step 155 when both the air conditioning switch 75 and the cool max. switch 75 are in the ON position. In step 155, it is determined whether the neutral switch 66 is in the ON position. If it is determined in step 155 that the neutral switch 66 is not in the ON position, the calculation of the desired engine speed NF is executed in step 156. Contrary to this, if it is determined in step 155 that the neutral switch 66 is in the ON position, the routine goes to step 157. In step 157, the temperature $TE_1$, indicating the temperature of air at the outlet of the evaporator 223 (FIG. 11) in the preceding processing cycle and stored in the RAM (FIG. 10), is subtracted from the temperature TE indicating the temperature of air at the outlet of the evaporator 223 at present, and the result of the subtraction is put into ΔE. Consequently, if the temperature of air at the outlet of the evaporator 223 is increasing, ΔE becomes positive and, if the temperature of air at the outlet of the evaporator 223 is decreasing, ΔE becomes negative. Then, in step 158, it is determined whether ΔE is negative. If it is determined in step 158 that ΔE is not negative, the calculation of the desired engine speed NF is executed in step 159 and, if it is determined in step 158 that ΔE is negative, the calculation of the desired engine speed NF is executed in step 160. FIG. 18 illustrates the relationship between the desired engine speed NF and the temperature T of air at the outlet of the evaporator 223 in the case wherein the automatic transmission is in the neutral range, and FIG. 19 illustrates the relationship between the desired engine speed NF and the temperature T of air at the outlet of the evaporator 223 in the case wherein the automatic transmission is in the drive range. From FIG. 18, it will be understood that the desired engine speed NF, illustrated by the solid line in FIG. 18, is a fixed speed of about 650 r.p.m. when the temperature T is lower than about 5° C.; the desired engine speed NF is monotonously increased when the temperature T is in the range of 5° C. through 15° C., and the desired engine speed NF is a fixed speed of about 800 r.p.m. when the temperature T is higher than 15° C. In addition, from FIG. 18, it will be also understood that the desired engine speed NF, illustrated by the broken line in FIG. 18, is monotonously increased when the temperature T is in the range of 15° C. through 25° C., and the desired engine speed NF is a fixed speed of about 1150 r.p.m. when the temperature T is higher than 25° C. In FIG. 18, the desired angle speed NF, illustrated by the solid line, indicates the desired engine speed in the case wherein the temperature T is increasing, and the desired engine speed NF, illustrated by the broken line, indicates the desired engine speed in the case wherein the temperature T is decreasing. On the other hand, from FIG. 19, it will be understood that the desired engine speed NF is a fixed speed of about 600 r.p.m. when the temperature T is lower than 5° C.; the desired engine speed NF is monotonously increased when the temperature T is in the range of 5° C. through 15° C., and; the desired engine speed NF is a fixed speed of about 750 r.p.m. when the temperature T is higher than 15° C. The relationship between the desired engine speed NF and the temperature T, illustrated in FIGS. 18 and 19, is stored in the ROM 82 in the form of a function or a data table. In step 156 of FIG. 15, the desired engine speed NF is calculated from the relationship illustrated in FIG. 19. On the other hand, in step 159, the desired engine speed NF is calculated from the relationship illustrated by the solid line in FIG. 18, and in step 160, the desired engine speed NF is calculated from the relationship illustrated by the broken line in FIG. 18.

When the desired engine speed NF is calculated, the routine goes to step 125 in FIG. 14. In step 125, "1" is put into the step number STEP of the step motor 9, and "1" is put into the rotating direction DIR of the step motor 9. In this regard, DIR=1 indicates the rotating direction wherein the valve head 36 (FIG. 2) is moved to close, and DIR=0 indicates the rotating direction wherein the valve head 36 is moved to open. Then, in step 126, the desired engine speed NF is subtracted from the mean value of the engine speed N, and the result of the subtraction is put into $\Delta NE$. Consequently, $\Delta NE$ becomes positive when the mean value of the engine speed N is higher than the desired engine speed NF, and $\Delta NE$ becomes negative when the mean value of the engine speed N is lower than the desired engine speed NF. Then, in step 127, it is determined whether $\Delta NE$ is not less than zero, and when $\Delta NE$ is not lower than zero, the routine jumps to step 128. Contrary to this, if it is determined in step 127 that $\Delta NE$ is lower than zero, the routine goes to step 129, and the absolute value of $\Delta NE$ is input into $\Delta NE$. Then, in step 130, "1" is put into the step number STEP of the step motor 9, and "0" is put into the rotating direction DIR of the step motor 9. After this, the routine goes to step 128. In step 128, it is determined whether $\Delta NE$ is not lower than 20 r.p.m. If it is determined in step 128 that $\Delta NE$ is not lower than 20 r.p.m., the routine goes to step 131 and, if it is determined in step 128 that $\Delta NE$ is lower than 20 r.p.m., the routine jumps to step 112. In step 112, the feedback flag is set again and, then, in step 113, the waiting time flag is set again. Consequently, in the case wherein the absolute value of $\Delta NE$ is less than 20 r.p.m., the step motor 9 remains stationary, and the engine speed is measured for 1.6 sec after the waiting time 1.6 sec has elapsed. That is, in the case wherein the absolute value of the difference $\Delta NE$ between the desired engine speed NF and the mean value N of the engine speed measured between the time $t_c$ to the time $t_d$ in FIG. 16 is lower than 20 r.p.m., the engine speed is measured again between the time $t_e$ and the time $t_f$ in FIG. 16 after the waiting time 1.6 sec between the time $t_d$ and the time $t_e$ has elapsed. Then, in the case wherein the absolute value of the difference $\Delta NE'$ between the desired engine speed NF and the mean value N of the engine speed measured between the time $t_e$ and the time $t_f$ in FIG. 16 is not lower than 20 r.p.m., the routine goes to step 131 in FIG. 14 as mentioned above. In step 131, it is determined whether the rotating direction DIR of the step motor 9 is equal to "1", that is, whether the rotating direction of the step motor 9 is a direction wherein the valve head 36 (FIG. 2) is moved to close. If it is determined in step 131 that the rotating direction DIR of the step motor 9 is a direction wherein the valve head 36 is moved to open, the step number "1" of the step motor 9 and the rotating direction DIR=0 of the step motor 9 are stored in a predetermined address in the RAM 81. On the other hand, if it is determined in step 131 that the rotating direction DIR of the step motor 9 is a direction wherein the valve head 36 is caused to close, the routine goes to step 133. In step 133, the step position of the step motor 9, which is stored in the RAM 81, and the lower limit Mini of the step position, which is calculated in step 111, are compared. If it is determined in step 133 that the step position of the step motor 9 is larger than the lower limit Mini of the step position, the step number "1" of the step motor 9 and the rotating direction DIR=1 of the step motor 9 are stored in a predetermined address in the RAM 81 in step 132. Contrary to this, if it is determined in step 113 that the step position of the step motor 9 is not larger than the lower limit Mini of the step position, the routine successively goes to steps 112, 113 and 114 and, then, in step 104, the step motor drive processing is executed. However, at this time, actually, the step motor 9 remains stationary and, then, the engine speed is measured for 1.6 sec after the waiting time 1.6 sec has elapsed. On the other hand, after the step number and the rotating direction of the step motor 9 are stored in a predetermined address in the RAM 81 in step 132, the routine successively goes to steps 112, 113 and 114 and, then, in step 104, the step motor drive processing is executed. In step 104, the step motor drive data is written in the output port 84 on the basis of the step number and the rotating direction of the step motor 9, which are stored in the RAM 81. As a result of this, at the time $t_f$ in FIG. 16, the step motor 9 is rotated by one step in the rotating direction wherein the valve head 36 (FIG. 2) is moved to close as illustrated in FIG. 16 (c). Then, the engine speed is measured again for 1.6 sec after the waiting time 1.6 sec has elapsed.

According to the present invention, it is possible to precisely control the amount of air flowing within the bypass pipe by using a step motor. In addition, as illustrated in FIGS. 18 and 19, the desired engine speed NF is increased only when the cool max. switch 75 is in the ON position and when the temperature T of air at the outlet of the evaporator 223 is high. It is only in a hot season that the cool max. switch 75 is turned to the ON position, and the temperature T becomes high. Consequently, it is possible to improve the fuel consumption as compared with the case wherein the idling speed of the engine is increased when the air conditioning device is operated as in a prior conditioning system. In addition, in the case wherein ambient temperature is high when the cooling operation is started, even if the air mix damper 208 (FIG. 11) is rotated to a position wherein the cool max. switch 75 is turned to the ON position, the cooling ability is still poor. Consequently, in such a case, in the present invention, by increasing the desired engine speed NF as illustrated in the broken line in FIG. 18, the idling speed of the engine is increased. As a result of this, since the rotating speed of the compressor for cooling (not shown) is increased, the cooling ability can be improved. In addition, if the step motor 9 is rotated in a rotating direction wherein the valve head 36 is moved to close or open when the engine speed is higher or lower than the desired engine speed, respectively, the amount of air fed into the surge tank 1 from the bypass pipe 16 is reduced or increased everytime the engine speed is higher or lower than the desired engine speed, respectively. As a result of this, the fluctuation in the engine speed becomes large. In the present invention, in order to suppress such a fluctuation in the engine speed, the step motor 9 remains stationary when the absolute value of the difference ΔNE between the desired engine speed NF and the mean value N of the engine speed is lower than 20 r.p.m., and the step motor 9 is rotated by one step when the absolute value of the above-mentioned difference ΔNE is not lower than 20 r.p.m. In addition, the engine speed is unstable a little while after the step motor 9 is rotated by one step. Consequently, in the present invention, in order to measure the engine speed after it becomes stable, the engine speed is measured after the waiting time 1.6 sec has elapsed.

While the invention has been described by reference to a specific embodiment chosen for purposes of illustration, it should be apparent that numerous modifications could be made thereto by those skilled in the art without departing from the basic concept and scope of the invention.

We claim:

1. A device of controlling the idling speed of an engine of a vehicle having an air conditioning apparatus for cooling a driver's compartment, said engine comprising a main intake passage, a throttle valve arranged in the main intake passage, a bypass passage branched off from the main intake passage upstream of the throttle valve and connected to the main intake passage downstream of the throttle valve, a control valve arranged in the bypass passage, and a step motor actuating the control valve for controlling the amount of air flowing within the bypass passage, said air conditioning apparatus comprising an air duct which interconnects the driver's compartment to the exterior of the vehicle, a suction fan arranged in the air duct, an evaporator arranged in the air duct, a heat exchanger arranged in the air duct at a position located downstream of the evaporator, and an air mixture damper arranged in the air duct between the evaporator and the heat exchanger for controlling the amount of air directly flowing into the driver's compartment and for controlling the amount of air flowing into the driver's compartment via the heat exchanger, wherein said device comprises: first means for detecting the engine speed to produce a first signal indicating the engine speed; second means for detecting the operating condition of the engine to produce a second signal indicating that the engine is operating in an idling state; third means arranged in the air duct for producing a third signal indicating the temperature of air which has passed through the evaporator; fourth means cooperating with the air mixture damper for producing a fourth signal indicating that the entire air directly flows into the driver's compartment without passing through the heat exchanger, and; electronic control means in response to said first signal, said second signal, said third signal and said fourth signal for rotating the step motor in a rotating direction wherein the engine speed approaches a predetermined desired idling speed when the engine is operating in an idling state, said desired idling speed being increased when the temperature of air which has passed through the evaporator is higher than a predetermined temperature and when said fourth means produces said fourth signal.

2. A device according to claim 1, wherein said electronic control means comprises memory means in which said desired idling speed is stored.

3. A device according to claim 1, wherein said device further comprises fifth means which produces a fifth signal indicating that an automatic transmission is in a neutral range, said desired idling speed in the neutral range being higher than that in a drive range of the automatic transmission.

4. A device according to claim 3, wherein said electronic control means comprises determining means which determines whether said temperature of air is increasing or decreasing when the automatic transmission is in a neutral range; when said temperature of air is higher than the predetermined temperature, and; when said fourth means produces said fourth signal, said desired idling speed being increased when said temperature of air is decreasing, as compared with the case wherein said temperature of air is increasing.

5. A device according to claim 1, wherein said second means comprises a throttle switch and a vehicle speed sensor.

6. A device according to claim 1, wherein said air mixture damper is pivotally mounted on said air duct and automatically controlled in accordance with a change in temperature of the driver's compartment, said fourth means being a switch which is engageable with the air mixture damper.

* * * * *